United States Patent
Lim

(10) Patent No.: US 8,537,903 B2
(45) Date of Patent: Sep. 17, 2013

(54) DE-BLOCKING AND DE-RINGING SYSTEMS AND METHODS

(75) Inventor: Kyoungwon Lim, Austin, TX (US)

(73) Assignee: Entropic Communications, Inc., San Diego, CA (US)

( * ) Notice: Subject to any disclaimer, the term of this patent is extended or adjusted under 35 U.S.C. 154(b) by 1862 days.

(21) Appl. No.: 11/233,674

(22) Filed: Sep. 23, 2005

(65) Prior Publication Data

US 2007/0071095 A1    Mar. 29, 2007

(51) Int. Cl.
*H04N 7/12* (2006.01)

(52) U.S. Cl.
USPC ............ 375/240.29; 382/266; 382/269

(58) Field of Classification Search
USPC .............. 375/240, 240.8, 240.24, 240.29; 382/266, 269
See application file for complete search history.

(56) References Cited

U.S. PATENT DOCUMENTS

| 6,983,079 | B2 * | 1/2006 | Kim .......................... 382/275 |
| 7,215,823 | B2 * | 5/2007 | Miura et al. ................. 382/268 |

OTHER PUBLICATIONS

H.C. Reeve and J.S. Lim, "Reduction of blocking effect in image coding," Optical engineering, vol. 23, No. 1, pp. 34-37. Jan./Feb. 1984.
Y. Yang, N.P. Galatsanos, and A.K. Katsaggelos, "Regularized reconstruction to reduce blocking artifacts of the block discrete cosine transform compressed images," IEEE Transaction on Circuit and System, Video Technology, vol. 3, pp. 421-432, Dec. 1993.
Y.L. Lee, H.C. Kim, and H.W. Park, "Blocking effect reduction JPEG images by signal adaptive filtering," IEEE Transaction on Image Processing, vol. 7, No. 2, pp. 229-234, Feb. 1998.
ITU-T Series H: Audiovisual and Multimedia Systems, H.264, Mar. 2005, pp. 195-199.
De-blocking/de-ringing filtering in MPEG-4 part 2, ISO/IEC 14 496-2. Mar. 2001.

* cited by examiner

*Primary Examiner* — Kim Vu
*Assistant Examiner* — Ruiping Li
(74) *Attorney, Agent, or Firm* — Bruce Greenhaus; Richard Bachand; Duane Morris LLP

(57) ABSTRACT

Disclosed herein are various embodiments of decoding systems and methods. In one embodiment, among others, a decoding system comprises a de-blocking system configured to receive decoded video data and decoding information and remove blocking artifacts from the decoded video data, and a de-ringing system configured to remove ringing artifacts from the de-blocked video data.

29 Claims, 16 Drawing Sheets

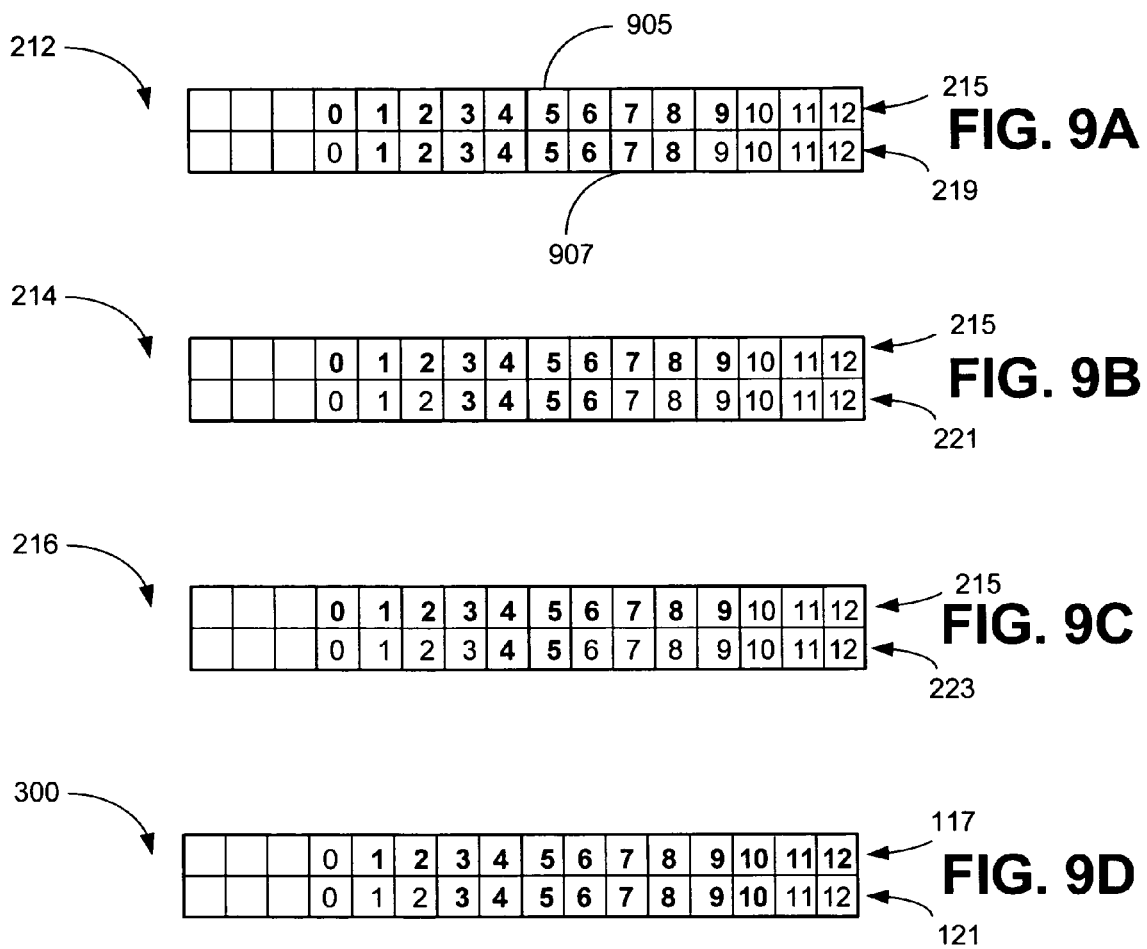

DE-BLOCKING AND DE-RINGING SYSTEMS AND METHODS

BACKGROUND OF THE INVENTION

1. Field of the Invention

The present invention is generally related to image processing, and, more particularly, is related to a system and method for processing video data.

2. Related Art

Many of the current video standards typically rely on a block coding scheme. For instance, MPEG-2 video compression is based on the block-based transform coding method which comprises block based temporal prediction, block based discrete cosine transform (DCT) processing, block based quantization, and entropy coding. The block based quantization may introduce distortion (e.g., coding artifacts) to a reconstructed image. That is, such coding artifacts, which include blocking artifacts and ringing artifacts, may be introduced to the decoded image from the quantization process. The quantization is basically a lossy compression process applied to DCT coefficients. The blocking artifact is caused by information loss of the low frequency DCT coefficients. Because the low frequency DCT coefficients are highly correlated across blocks, the loss in the low frequency coefficients breaks the correlation and it appears as abrupt changes of pixel values across block boundaries. The ringing artifact occurs when an image block has an obvious edge pattern and its high frequency DCT coefficients are degraded. The ringing artifact spreads out to flat regions within the block near the edge.

Various methods have been employed in the past and present to address such coding artifacts. Unfortunately, such methods, in general, either addressed one of the coding artifacts only, or had application only to still pictures (versus video).

SUMMARY

Disclosed herein are various embodiments of decoding systems and methods. In one embodiment, among others, a decoding system comprises a de-blocking system configured to receive decoded video data and decoding information and remove blocking artifacts from the decoded video data, and a de-ringing system configured to remove ringing artifacts from the de-blocked video data.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

FIG. 5 is a schematic diagram that illustrates the luminance component and boundaries filtered by the decoding system of FIG. 1 and related ROS when mb_field_dct flags of a vertically adjacent block and a current block are both ON.

FIGS. 9A-9D are schematic diagrams that illustrate exemplary inputs and outputs of the decoding system of FIG. 1.

DETAILED DESCRIPTION

Figure 1:
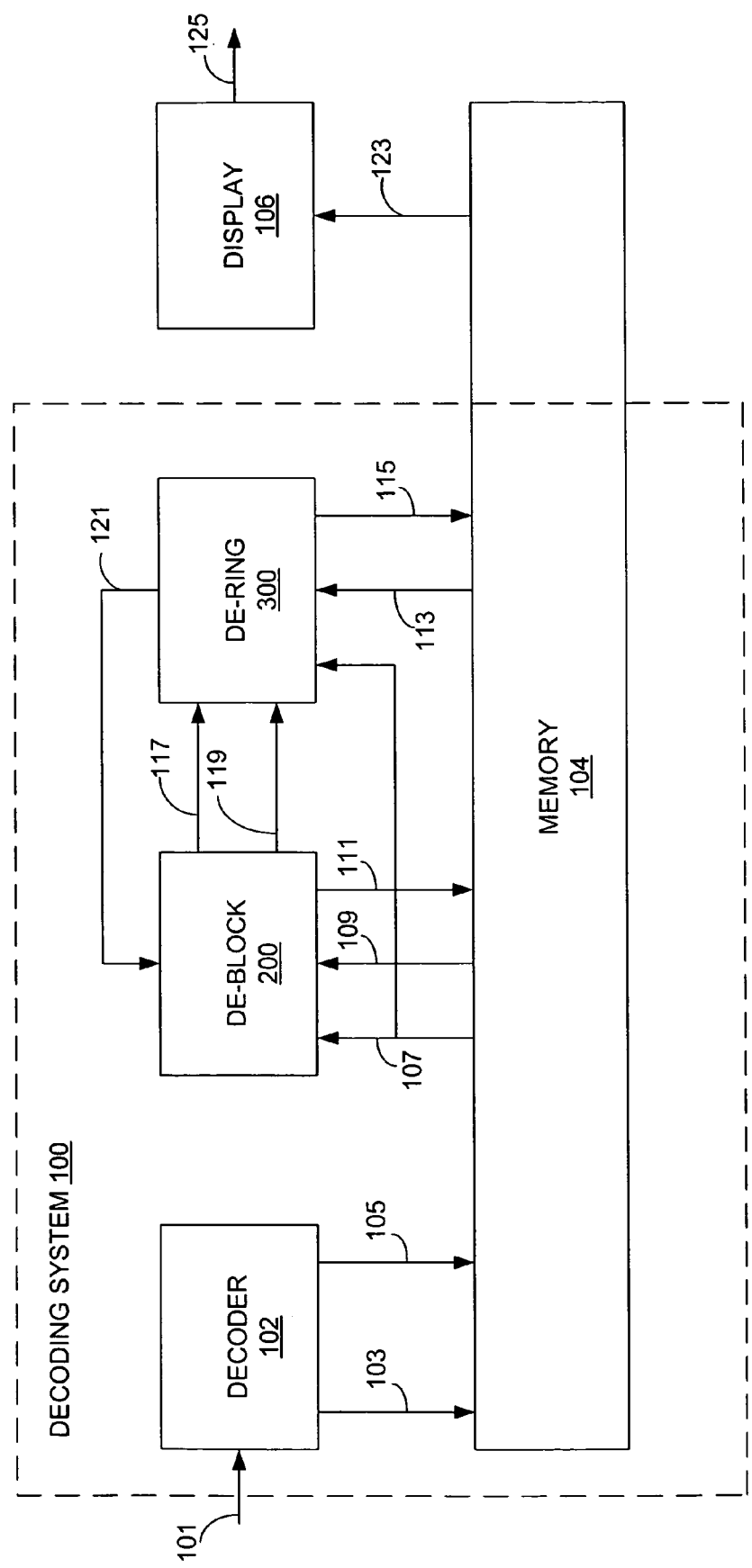
FIG. 1 is a block diagram of a decoding system embodiment.

Disclosed herein are various embodiments of decoding systems and methods (herein, referred to as a decoding system). Such embodiments assume that discrete cosine transform (DCT) coefficients and quantization are involved in the encoding process. Operation is pipelined by macroblock basis. For each macroblock, the decoding system extracts some of the decoding information from bitstream, calculates an edge map, organizes input pixels for the horizontal and vertical processing and performs actual adaptive filtering. The disclosed decoding system embodiments comprise a de-blocking system and a de-ringing system that removes distortion, such as coding artifacts (e.g., including blocking and ringing artifacts), from the decoded pictures of a digital bitstream. Note that herein reference to removing blocking and/or ringing artifacts is not limited to complete removal of blocking and/or ringing artifacts, but may also refer to removal of a percentage of the same. Further, the coding artifacts removed by the decoding system embodiments disclosed herein are not limited to blocking or ringing artifacts.

The de-blocking system detects and smoothes out boundary discontinuities across the n×m block boundaries, where n and m may comprise integer numbers greater than or equal to 4 (e.g., 4×4, 4×8, 8×16, 8×8, etc.). The de-ringing system distinguishes coding artifacts other than blocking artifact from a real image edge based on an edge map and applies a smoothing filter to selected pixels. In one embodiment, the de-blocking system is followed by the de-ringing system. In some decoding system embodiments, a de-blocking system may operate without a de-ringing system or vice versa.

The de-blocking system organizes its input pixels based on decoding information (e.g., macroblock level bitstream information such as a field_DCT flag) to handle interlaced video properly. Five different grouping methods are possible: one for vertical boundary filtering and four for horizontal boundary filtering. The de-blocking system comprises four internal filtering modes with an output that can be selected according to image characteristics. The filtering modes include flat region filtering mode, low activity region filtering mode, default filtering mode, and bypass mode. In some embodiments, fewer filters (e.g., a single filter) or more filters may be employed. A mode decision module of the de-blocking system analyzes a group of input pixels via a 1×4 DCT process and determines a filtering mode based on 1×4 DCT coefficients. Some properties of 1×4 DCT coefficients were investigated to specify boundary discontinuity and image complexity surrounding a block boundary. Such properties are utilized in the mode decision module. Bitstream information and a quantization parameter are also utilized in each filtering mode to prevent the actual image pattern from being interpreted as a boundary discontinuity.

The de-ringing system comprises a cascaded filter that may follow the de-blocking system. In one embodiment, the de-ringing system receives the results of the de-blocking system as its inputs, and calculates two types of edge maps based on a block level threshold value and a pixel level threshold value. The de-ringing system incorporates block level parameter values of temporally neighboring macroblocks and maintains temporal consistency of the block level edge map. The block level parameters include dynamic range and threshold values, the former denoting the block-wise difference between maximum and minimum pixel values and the latter denoting block-wise average of the maximum and minimum pixel values. The de-ringing system utilizes dynamic range while it selects a best threshold value for each block. The de-ringing system is enabled when both edge maps indicate no edge at a defined filtering location. The quantization parameter is utilized to generate a pixel level threshold value.

The described embodiments may be embodied in many wired and/or wireless communication devices, including computers (desktop, portable, laptop, etc.), consumer electronic devices (e.g., multi-media players), compatible telecommunication devices, telephone communication systems and devices (e.g., voice over IP phones), personal digital assistants (PDAs), or any other type of devices, such as printers, fax machines, scanners, hubs, switches, routers, set-top boxes, televisions, etc.

Further, although described in the context of 8×8 transform coding cases, the embodiments described herein may also apply to 4×4 transform coding cases, such as MPEG4-part10 and Microsoft VC1 with slight modifications to the use of one dimensional arrays, the area of the 4×1 DCT, filtering positions within the region of support, etc. as would be understood by one having ordinary skill in the art in the context of the disclosure.

FIG. 1 is a block diagram of a decoding system embodiment 100. In one embodiment, the decoding system 100 is part of a three-stage pipelined operation. The first stage comprises a decoder 102, the second stage comprises the combination of a de-blocking system (de-block) 200 and a de-ringing system (de-ring) 300, and the third stage comprises a display 106. The three pipelined operations can run simultaneously, where the decoder 102 corresponds to processing of an N-th frame, the de-blocking system 200 and the de-ringing system 300 correspond to processing of the (N−1)-th frame, and the display system 106 corresponds to processing of the (N−2)-th frame. The decoding system 100 comprises the decoder 102, the de-blocking system 200, the de-ringing system 300, and memory 104. One skilled in the art would understand that some embodiments of the decoding system 100 may comprise fewer or greater components. The de-blocking system 200 removes boundary discontinuity at every macroblock or block boundary (e.g., 16 lines×8 pixels or 8 lines×8 pixels boundaries). The de-ringing system 300 removes ringing artifacts inside each macroblock or block (e.g., 16×8, or 8×8). The memory 104 is used to transfer data among the various components of the decoding system 100 and display 106.

In operation, the decoder 102 receives a bitstream on connection 101 and decodes the bitstream and stores the resulting images (decoded pictures) in memory 104 via connection 103. The resulting images may include blocking and ringing artifacts. The decoder 102 also extracts decoding information (e.g., macroblock level information) from the bitstream while performing decoding operations, and stores the same in memory 104 via connection 105.

The decoding information is used by the decoding system 100 to find a temporally consistent edge map, to organize input pixels for horizontal and vertical filter processing, and to control smoothness of the resulting decoded image. The decoding information includes a field DCT flag (mb_field_dct), macroblock type (mb_type), a quantization scale factor (e.g., Qp=Q_table[quantizer scale type][mquant]), and block motion (mb_mspeed_v, mb_mspeed_h). The field DCT flag enables the decoding system 100 to determine how to organize input pixels for the horizontal and vertical filtering process. The macroblock type flag controls temporal propagation of parameter values to achieve a temporally consistent edge map. The quantization scale factor enables the decoding system 100 to determine an artifact level for which different kinds of smoothing filters can be applied to remove blocking and ringing artifacts. The block motion controls temporal propagation of parameter values to enable the decoding system 100 to achieve a temporally consistent edge map. The memory 104 stores the extracted macroblock level information by the number of macroblocks in the decoded picture or image.

A few arithmetic operations are implemented in the decoder 102 to extract the block motion information from the bitstream. Both horizontal and vertical components are calculated independently based on macroblock type (mb_type), prediction type (motion_type), picture type (picture_type), and motion vectors (PMV[ ][ ][ ]) as shown in the following pseudo code:

```
if ((mb_type&MB_INTRA)==0) {
/* motion speed check */
if (mb_type & MB_FORWARD) {
  if (motion_type == MC_FRAME) {
    spd_y = PMV[0][0][1]/2;
    spd_x = PMV[0][0][0]/2;
```

-continued

```
    } else {
        spd_y = (abs(PMV[0][0][1]/2) >= abs(PMV[1][0][1]/2)) ?
PMV[1][0][1]/2 : PMV[0][0][1]/2;
        spd_x = (abs(PMV[0][0][0]/2) >= abs(PMV[1][0][0]/2)) ?
PMV[1][0][0]/2 : PMV[0][0][0]/2;
    }
} else if (mb_type & MB_BACKWARD) {
    spd_y = maximum bound of PMV;
    spd_x = maximum bound of PMV;
} else if (picture_type == P_PICTURE) { /* No MC */
    spd_y = 0;
    spd_x = 0;
}
if (spd_y<-fast_motion_bound) mb_mspeed_v = -3;
else if ((spd_y>=-fast_motion_bound) && (spd_y<0))
    mb_mspeed_v = -1;
else if (spd_y==0) mb_mspeed_v = 0;
else if ((spd_y>0) && (spd_y<= fast_motion_bound))
    mb_mspeed_v = 1;
else mb_mspeed_v = 3;
if (spd_x<-fast_motion_bound) mb_mspeed_h = -3;
else if ((spd_x>=-fast_motion_bound) && (spd_x<0))
    mb_mspeed_h = -1;
else if (spd_x==0) mb_mspeed_h = 0;
else if ((spd_x>0) && (spd_x<=fast_motion_bound))
    mb_mspeed_h = 1;
else mb_mspeed_h = 3;
} else { /* MB_INTRA */
    mb_mspeed_v = 3;
    mb_mspeed_h = 3;
}
```

The block motion is determined based on an intermediate vector (spd_y, spd_x), wherein fast motion (3 or −3) is designated when one or both components are larger than +/−fast_motion_bound pixels/field, slow motion (−1 or 1) is designated when both components are within the range smaller than +/−fast_motion_bound pixels/field, and no motion (0) is designated when both components are 0 pixels/field. The intra-type macroblock and fast motion implies discontinuity of the temporal correlation between successive frames. So, depending on the block motion, propagation of some previous parameter values is turned on or off.

The de-blocking system 200 fetches the decoded image from memory 104 via connection 107 by the macroblock size, and fetches the corresponding decoding information (e.g., macroblock level information) via connection 109 each time a macroblock is read. Similarly, the de-ringing system 300 fetches the decoded image via connection 107 and the decoding information and threshold information via connection 113. As described below, the de-blocking system 200 comprises internal memory to store one slice (i.e., a row of macroblocks) of the macroblock image after de-blocking and de-ringing operations (the image, post-de-blocking and de-ringing operations, transferred via connection 121) have been implemented. For an input macroblock retrieved from memory 104, two horizontally and vertically neighboring macroblocks can be retrieved from the internal memory of the de-blocking system 200.

The de-blocking system 200 re-orders pixels in the current and neighboring macroblocks to one dimensional arrays for de-blocking and de-ringing filtering. The de-ringing system 300 receives one dimensional arrays of the image post-de-blocking operations and flag (mode) information from the de-blocking system 200 via the connection 117 and 119, respectively. While the de-ringing system 300 applies de-ringing filtering for these one dimensional arrays, the de-ringing system 300 simultaneously utilizes current macroblock pixels fetched via the connection 107 and decoding information and threshold information fetched via the connection 113 to calculate an edge map corresponding to the one-dimensional image arrays. The de-blocking system 200 and the de-ringing system 300 each comprise a one (1)-dimensional filtering structure, and thus the filtering operation is repeated along horizontal and vertical boundaries. The decoded image post-de-blocking and de-ringing operations is provided to memory 104 via connection 111. The de-ringing system 300 provides parameter values to memory 104 via connection 115, as explained below. The resulting image, post-de-ringing and de-blocking, is presented to the display 106 via connection 123, and processed and presented to a display screen (not shown) in known manner via connection 125. Note that in some embodiments, two (2) dimensional arrays comprising a group of one-dimensional arrays implemented under parallel processing may be employed.

Figure 2:
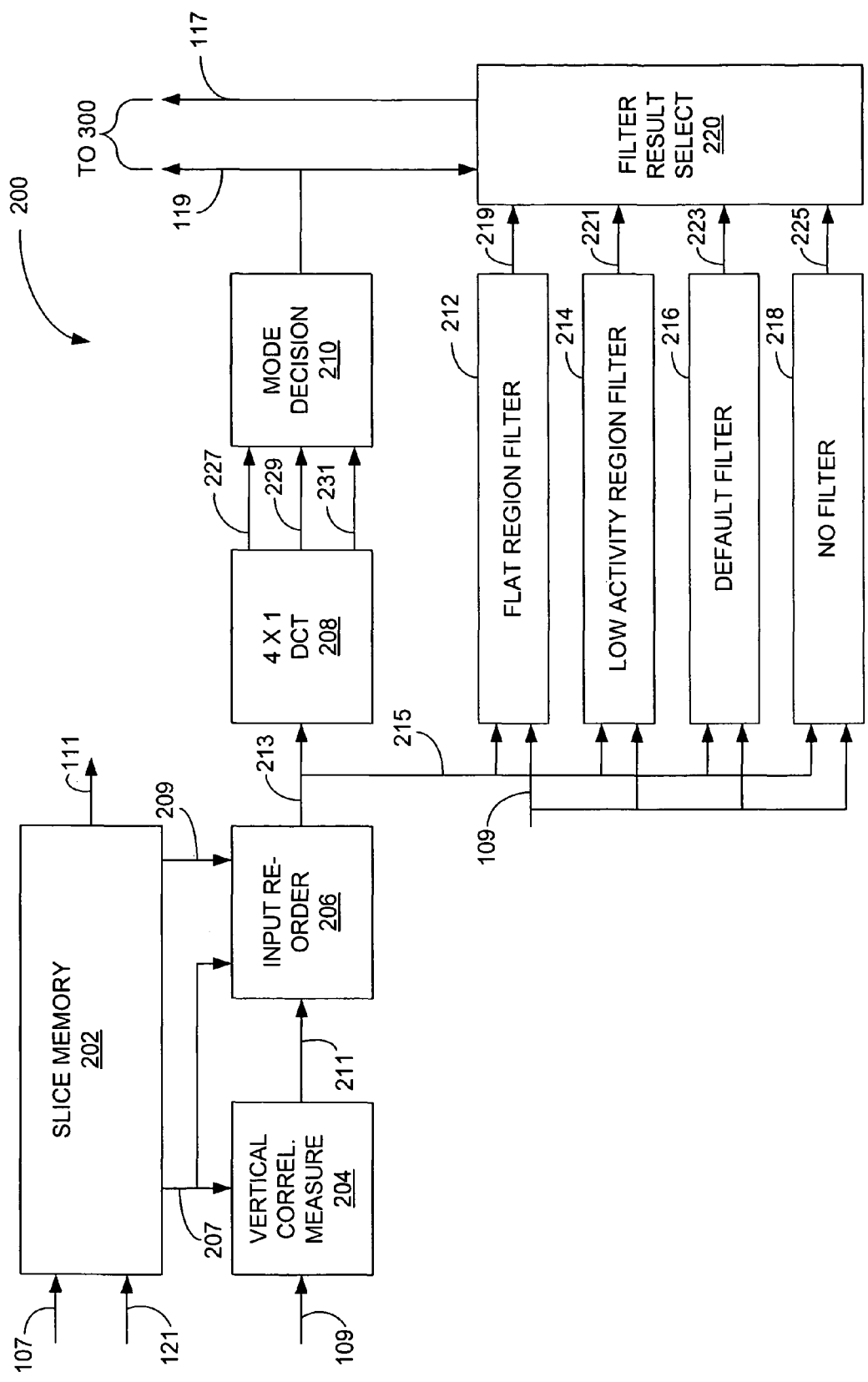
FIG. 2 is a block diagram of an embodiment of a de-blocking system of the decoding system shown in FIG. 1.

FIG. 2 is a block diagram of an embodiment of the de-blocking system 200. The de-blocking system 200 comprises an internal or slice memory 202, a vertical correlation measurement module 204, an input re-order module 206, a 4×1 DCT module 208, a mode decision module 210, filters 212, 214, 216, and 218, and a filter result selection module 220. The slice memory 202 comprises the size of one slice plus one macroblock to include one slice of the previous processing result and a current macroblock. The vertical correlation measurement module 204 corrects a mb_field_dct flag based on the current macroblock. Note that in some implementation, such as MPEG-4, part 10 and MICROSOFT VC1, flag correction is unnecessary. The input re-order module 206 extracts one (1) dimensional pixel rows from the current macroblock and two neighboring macroblocks. The re-ordering scheme varies along with the mb_field_dct flags.

The field DCT flag enables the input reorder module 206 to determine the way to organize input pixels processed by the de-blocking system 200 and the de-ringing system 300. The output video quality depends on the correctness of this flag. Theoretically, a field DCT (the field DCT flag is ON) is selected by the encoding system when there is field motion in the frame picture. In this case, vertical correlation is stronger within a field rather than a frame, since each field is sampled at a same sampling time. On the other hand, a frame DCT (the field DCT flag is OFF) is selected in a stationary image. Because the vertical sampling interval is smaller in the frame picture rather than the field picture, vertical correlation is stronger within a frame picture unless there is field motion. The vertical correlation can be variable depending on the field motion. Practically, however, there can be cases that vary significantly from this theoretical trend. For instance, an encoding process may include a feedback loop re-using previously decoded images to predict a current image. The previously decoded image can be corrupted by coding artifacts in the low bit rate. These coding artifacts might distort vertical correlation of the residual signal, the latter of which is a differential signal between the previous decoded image and the current image. As a result, the field DCT flag might be selected in a manner that conflicts with the theoretical trend.

The vertical correlation measurement module 204 corrects the field DCT flag based on the three vertical correlation measures, designated as sad_f, sad_t, and sad_b. These vertical correlation measures may be defined using the following equations:

$$sad\_f = \frac{\sum_{i=0}^{6}\sum_{j=0}^{15}|p(2i, j) - p(2i+1, j)| + |p(2i+1, j) - p(2i+2, j)|}{7 \times 16 \times 2},$$

$$sad\_t = \frac{\sum_{i=0}^{6}\sum_{j=0}^{15}|p(2i, j) - p(2i+2, j)|}{7 \times 16},$$

$$sad\_b = \frac{\sum_{i=0}^{6}\sum_{j=0}^{15}|p(2i+1, j) - p(2i+3, j)|}{7 \times 16}$$

Here, p(i, j) denotes a pixel value within a macroblock. The measure sad_f tends to be smaller than an average of sad_t and sad_b as the vertical correlation of the frame pixels becomes stronger than that of the field pixels. The following pseudo code shows an example procedure implemented by the vertical correlation measurement module 204 to correct the field DCT flag:

```
if ((mb_field_dct==OFF) && (sad_f>(sad_t+sad_b)/2) && (sad_f>MIN_DIFF)) {
    mb_field_dct = ON;
}
else if (((mb_field_dct==ON) && ((sad_t+sad_b)/2) >MIN_DIFF) &&
((sad_t+sad_b)/2 > 2sad_f)) ||
    ((mb_field_dct==ON) && ((sad_t+sad_b)/2) <=MIN_DIFF) &&
((sad_t+sad_b)/2 > sad_f)) ||
    ((mb_field_dct==ON) && ((sad_t+sad_b)/2) <=MIN_DIFF) &&
((sad_t+sad_b)/2 >= 2sad_f))) {
    mb_field_dct = OFF;
}
```

Note that MIN_DIFF is a threshold value which defines a minimum bound to turn the field DCT flag on.

The mode decision module 210, explained further below, analyzes spatial domain characteristics based on three (3) sets ($S_0$, $S_1$, and $S_2$) of 4×1 DCT coefficients, and decides whether the pixel rows, with which the 4×1 DCT coefficients were calculated, show boundary discontinuity, flat regions, smooth regions, or complex regions. Responsive to the analysis and decision, the mode decision module 210 enables the filter result selection module 220 to select one among the outputs of four (4) filters, the latter comprising a flat region filter 212, a low activity region filter 214, a default filter 216, and a null (no) filter 218. Each filter 212, 214, 216, and 218 varies in filtering location and transfer function. The filter result selection module 220 provides the filtered image to the de-ringing system 300.

Thus, in operation, the decoded image is received at the slice memory 202 via connection 107, and the image post-de-blocking and de-ringing operations is received at the slice memory 202 via connection 121. The slice memory 202 provides the current macroblock to the vertical correlation measurement module 204 and the input re-order module 206 via connection 207. Horizontally and vertically neighboring macroblocks are provided from the slice memory 202 to the input re-order module 206 via connection 209. The vertical correlation measurement module 204 receives macroblock information (e.g., mb_field_dct) via connection 109, and provides a corrected mb_field_dct to the input re-order module 206 via connection 211. The input re-order module 206 processes the received information and macroblocks and provides a row of pixels to the 4×1 DCT module 208 and the filters 212, 214, 216, and 218 via connections 213 and 215, respectively. The filters 212, 214, 216, and 218 receive macroblock level information (e.g., quantization_scale_factor) via connection 109. The 4×1 DCT module 208 provides DCT coefficients for sets $S_0$, $S_1$, and $S_2$ to mode decision module 210 via connections 227, 229, and 231, respectively. The mode decision module 210 provides the mode information over connection 119 to the de-ringing system 300 and enables the filter selection module 220 to select among the four (4) filters. The de-blocking filtered image is provided from filter result selection module 220 via connection 117 to the de-ringing system 300.

Figure 3:
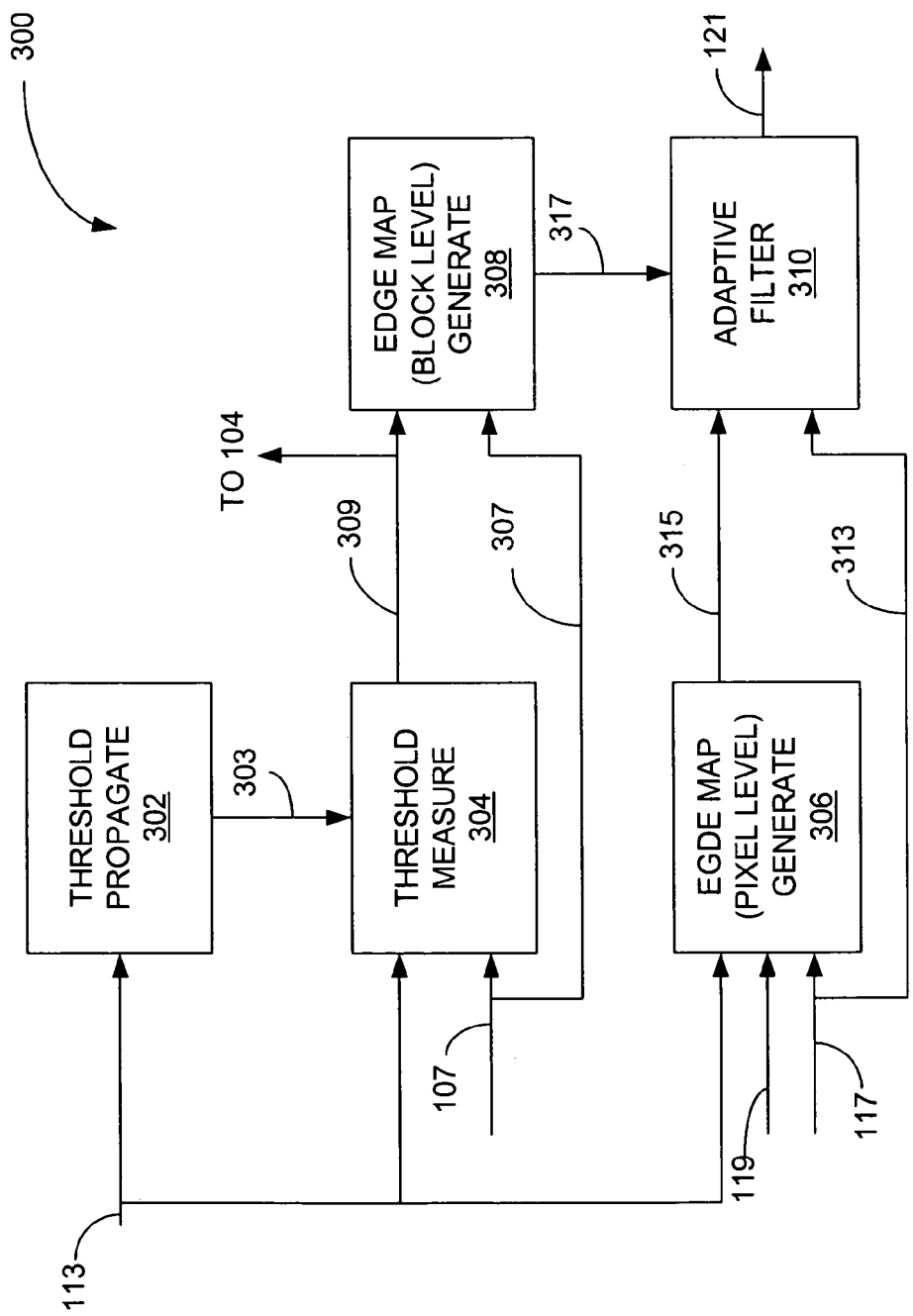
FIG. 3 is a block diagram of an embodiment of a de-ringing system of the decoding system shown in FIG. 1.

FIG. 3 is a block diagram of an embodiment of a de-ringing system 300. The de-ringing system 300 comprises a threshold propagate module 302, a threshold measurement module 304, an edge map (pixel level) generate module 306, an edge map (block level) generate module 308, and an adaptive filter 310. The threshold propagate module 302 retrieves (fetches or receives) parameter values of the previous frame from memory 104. The threshold measurement block 304 will use these parameter values conditionally depending on the motion in a frame and macroblock type. In addition, the threshold propagate module 302 itself uses motion information to determine candidate threshold values for each block in a current macroblock. The parameter values are range_prev (dynamic range) and thr_prev (threshold); the range_prev is determined through several conditional selections of a gray level difference between maximum and minimum pixel values in a block or macroblock and the thr_prev is determined through several conditional selections of a gray level average between the same maximum and minimum pixel values in a block or macroblock. The parameter values were calculated from the threshold measurement module 304 during the previous frame time. The threshold propagation module 302 fetches sixteen (16) range_prev values and sixteen (16) thr_prev values corresponding to sixteen (16) blocks covering a temporally co-located macroblock. The max_range_prev and max_thr_prev values are selected for each 8×8 block in a current macroblock from the sixteen (16) range_rev and thr_prev values.

The threshold measurement module 304 calculates new dynamic range and threshold values (max_range_cur and max_thr_cur) from the pixel data of the current macroblock, then selects the range and threshold values between propagated values and newly calculated values. That is, the range value is selected between max_range_prev and max_range_cur and threshold value is selected between max_thr_prev and max_thr_cur. By reusing previously calculated parameter values, it is possible to maintain consistency of the parameter values over the frames, and thus to get the resulting block level edge map more temporally consistent.

The edge map generation module 308 is described below. The edge map generation module 306 calculates the binary values, $e_k$, showing whether there is variation of pixel values over the artifact level near the filtering pixel location. These binary values can be interpreted as a pixel level edge map. The edge map generation module 306 uses a quantization scale factor to determine the artifact level.

Thus, in operation, threshold propagation module 302 receives parameter values corresponding to a previous frame from memory 104 via connection 113. Threshold propagation module 302 provides threshold measurement module 304 with parameter values of temporally neighboring macroblocks via connection 303. The threshold measurement module 304 receives macroblock information (e.g., block motion vector, mb_type) via connection 113 and the current macroblock via connection 107, the latter (current macroblock) of which is also received at the edge map generation module 308 via connection 307. The threshold measurement module 304 computes dynamic range and threshold values based on previously calculated range and threshold values and newly calculated range and threshold values, and provides the threshold values for the current macroblock to the edge map generation module 308 via connection 309 and the dynamic range and threshold values to memory 104.

The edge map generation module 306 receives macroblock information (e.g., quantization_scale_factor) via connection 113 and the flag information of the de-blocking filter via the connection 119 and de-blocking filtered image via connection 117, the latter data (de-blocking filtering result) also received at the adaptive filtering module 310 via connection 313. The edge map generation module 306 provides an edge map (pixel) to the adaptive filtering module 310 via connection 315. The adaptive filtering module 310 also receives the edge map (block) from edge map generation module 308 via connection 317. The adaptive filtering module 310 provides an output to the slice memory 202 via connection 121. The adaptive filtering module 310 is configured as a linear low pass filter in which selective filtering is implemented depending on the edge map information.

Figure 4:
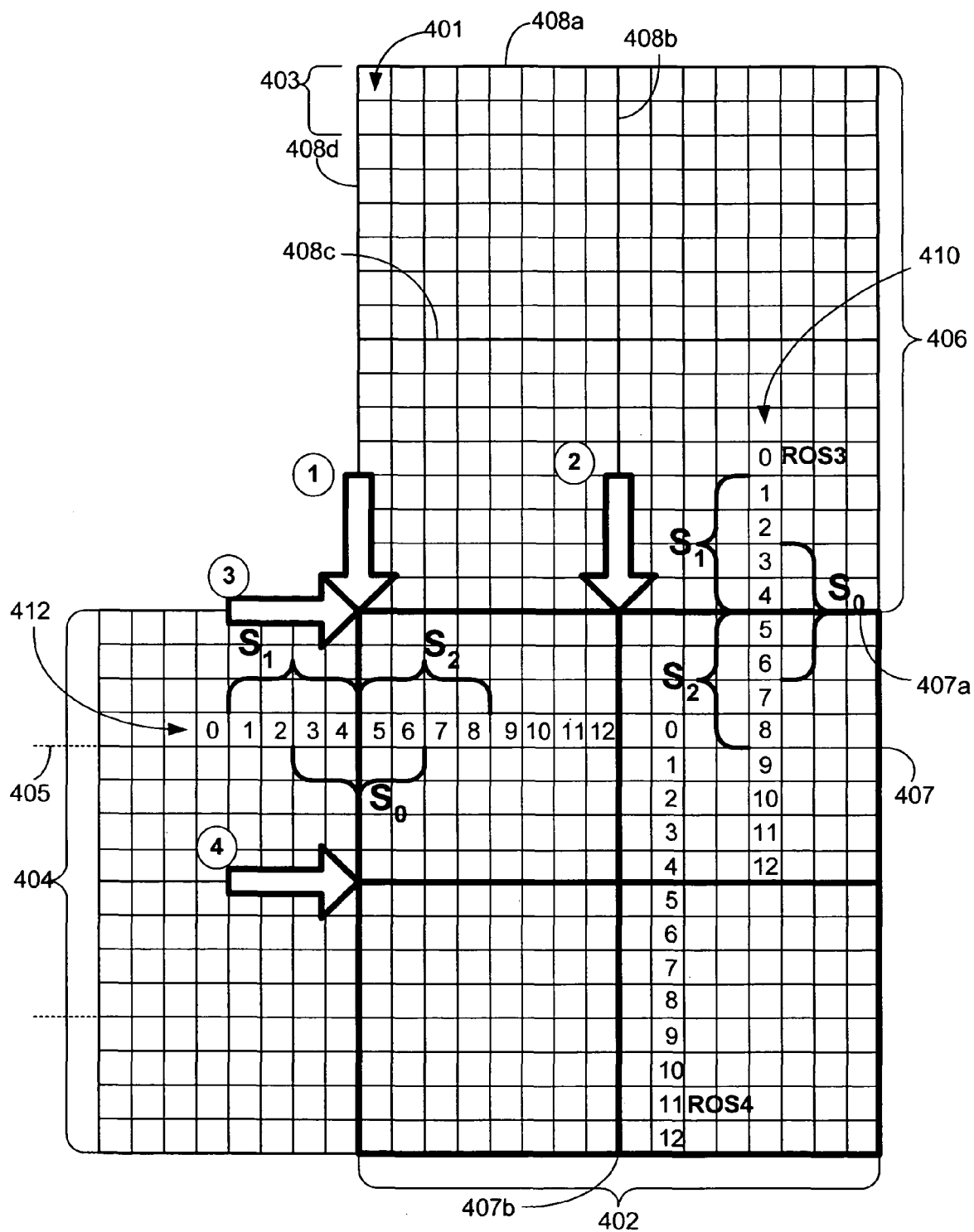
FIG. 4 is a schematic diagram that illustrates the luminance component and boundaries filtered by the decoding system of FIG. 1 and related region of support (ROS) when mb_field_dct flags of a vertically adjacent block and a current block are both OFF.
Figure 5:
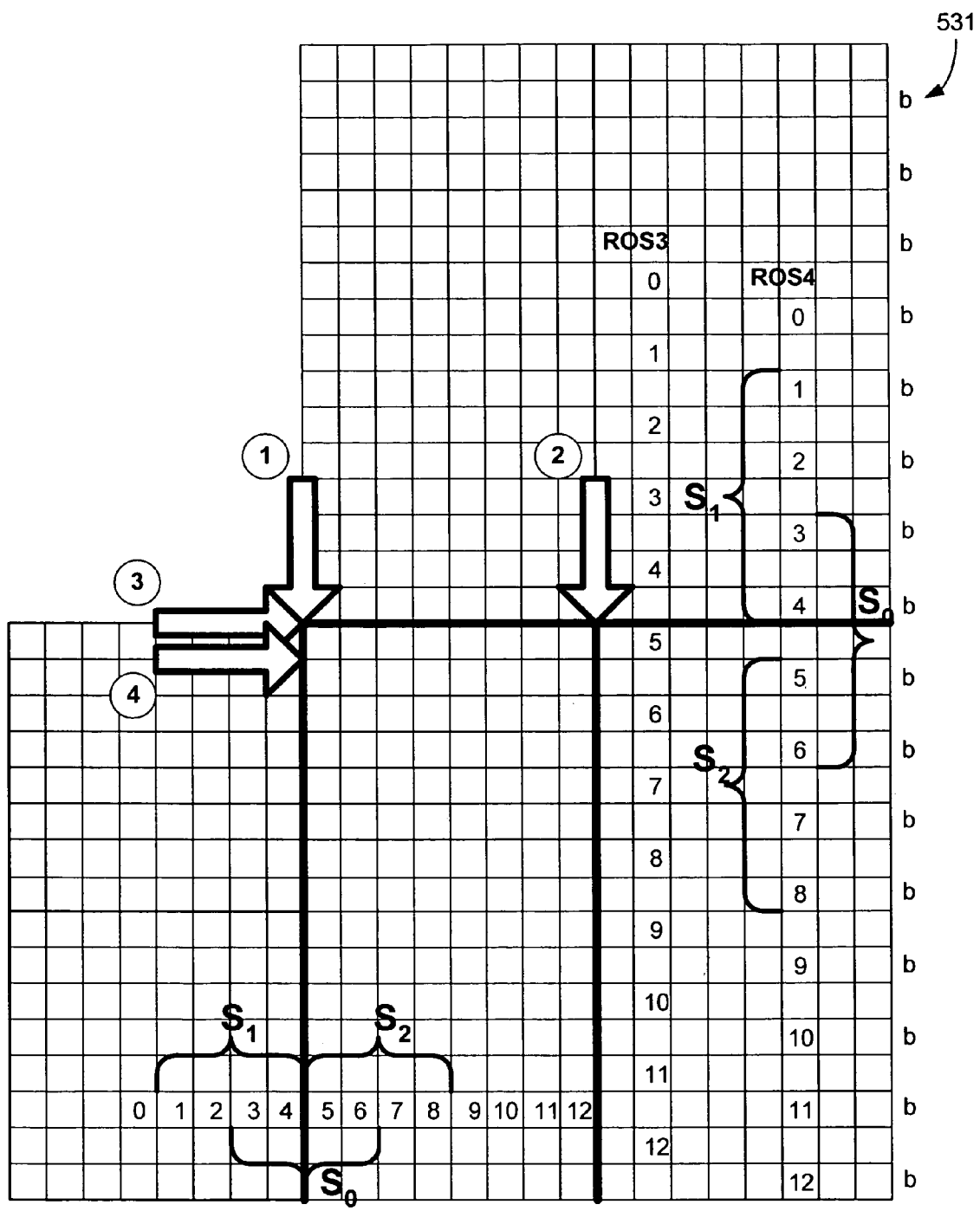

The de-blocking/de-ringing operations of the de-blocking system 200 and the de-ringing system 300 are applied to one macroblock at a time from left to right across a slice. FIGS. 4-8 are schematic diagrams that illustrate one exemplary order of filtering performed by the de-blocking system 200 and the de-ringing system 300 for each macroblock. Referring to FIG. 4, with similar application also to FIGS. 5-8, each square 401 refers to a pixel of a top field or frame 403. Frames with the designation "b" next to each row, as shown in FIG. 5, represent bottom field pixels 531. Shown is a current macroblock 402 (16×16), a horizontal neighbor macroblock 404 (only two 8×8 blocks are shown, with dotted line 405 symbolically representing that two (not shown) additional blocks are located adjacent the macroblock 404), and a vertical neighbor macroblock 406. Each 8×8 block is surrounded by a block boundary 408a-408d, with 408b and 408d each representing vertical boundaries and 408a and 408c each representing horizontal boundaries.

The numbers (e.g., 1-4) enclosed in circles refer to the order ("1" being first, "2" being second, etc.) of filtering across either horizontal or vertical boundaries. The darker shaded edges 407 represent edges across which filtering occurs. For instance, two edges across which filtering occurs include horizontal edge 407a and vertical edge 407b. The numbers 0-12 located in their respective pixels represent pixels ($v_0$ through $v_{12}$, respectively) used for filtering. Thus, filtering pixels 410 represent pixels used for filtering across the horizontal edge 407a, and the filtering pixels 412 represent pixels used for filtering across the vertical edge 407b. The ROS (region of support) designation (e.g., ROS3, ROS4, etc.) refers to a set of filtering pixels 410 or 412 that will be used as an input (e.g., input data) for the de-blocking and de-ringing filtering. One skilled in the art would recognize that regions of support can be defined for vertical boundaries as well, but are herein omitted for brevity. For instance, a region of support for the vertical boundary filtering designated by 1 enclosed in a circle can be designated as ROS1. In the FIGS. 4-8, ROS3 represents the region of support used during third block boundary filtering designated by a 3 enclosed in a circle. Similarly, ROS4 represents the region of support used during fourth block boundary filtering designated by a 4 enclosed by a circle. Three pixel arrays, $S_0$, $S_1$ and $S_2$, are the regions to which an approximated 4×1 DCT process is applied. One skilled in the art would recognize that the same pixel arrays are defined for all regions of support during filtering, but some (e.g., for ROS4 and vertical boundaries) are omitted for brevity. The 4×1 DCT coefficients are used in the de-blocking system 200 to analyze image characteristics and detect boundary discontinuities (e.g., block boundaries in the flat, smooth and complex image region).

Figure 7:
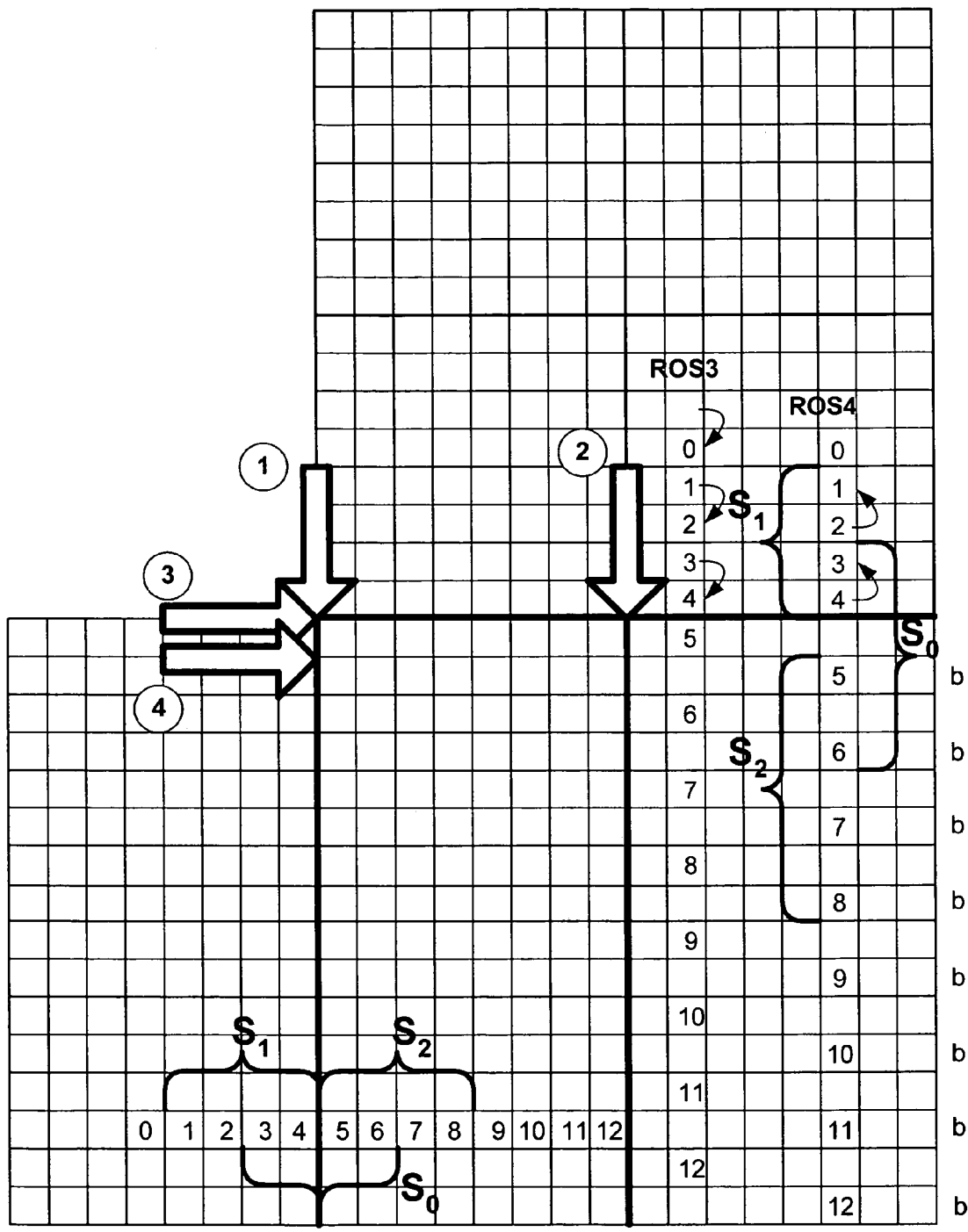
FIG. 7 is a schematic diagram that illustrates the luminance component and boundaries filtered by the decoding system of FIG. 1 and related ROS when mb_field_dct flags of a vertically adjacent block and a current block are both OFF and ON, respectively.
Figure 8:
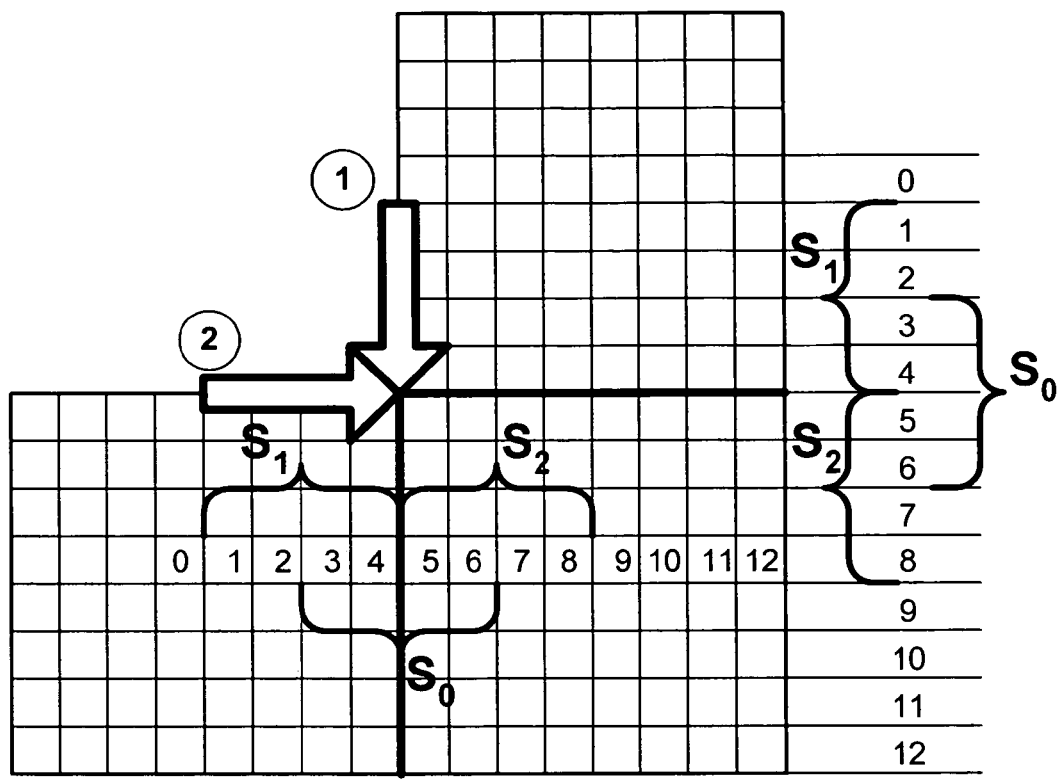
FIG. 8 is a schematic diagram that illustrates the chrominance component and boundaries filtered by the decoding system of FIG. 1 and related ROS.
Figure 10A:
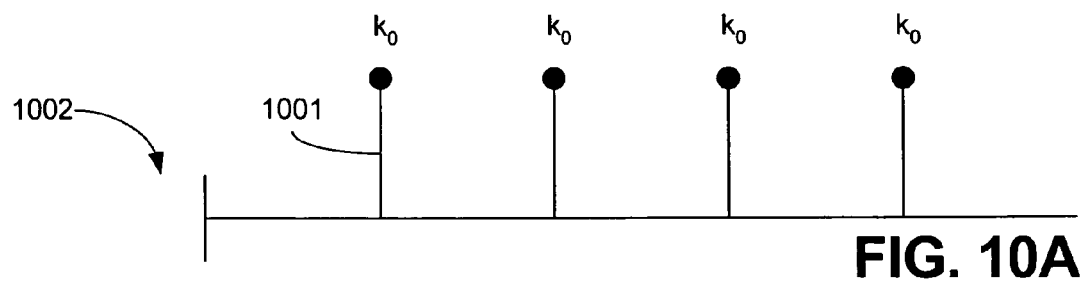
FIGS. 10A-10D are schematic diagrams that illustrate 4×1 discrete cosine transform (DCT) basis vectors corresponding to their transform coefficients according to the de-blocking system shown in FIG. 2.
Figure 10B:
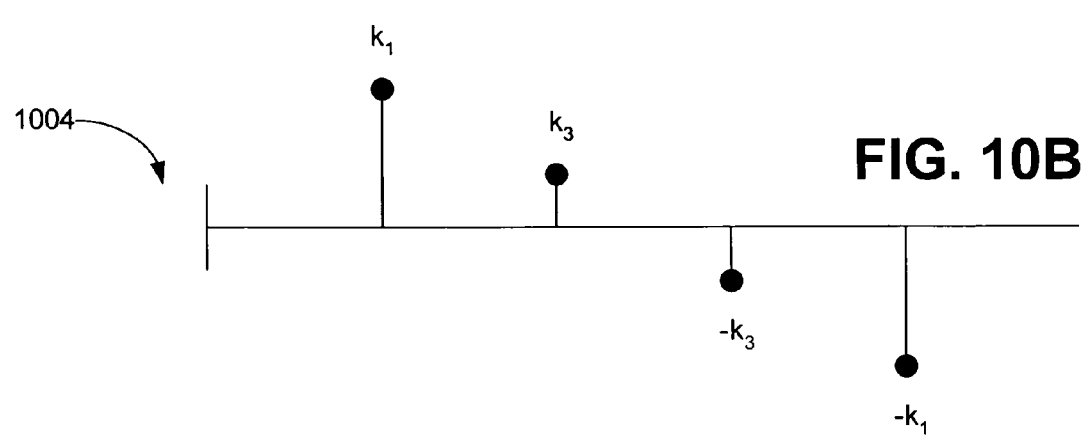
Figure 10C:
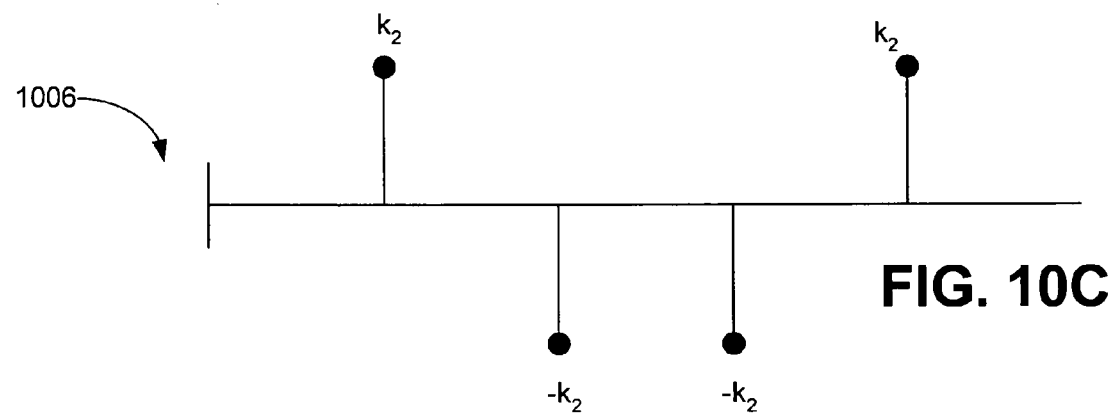
Figure 10D:
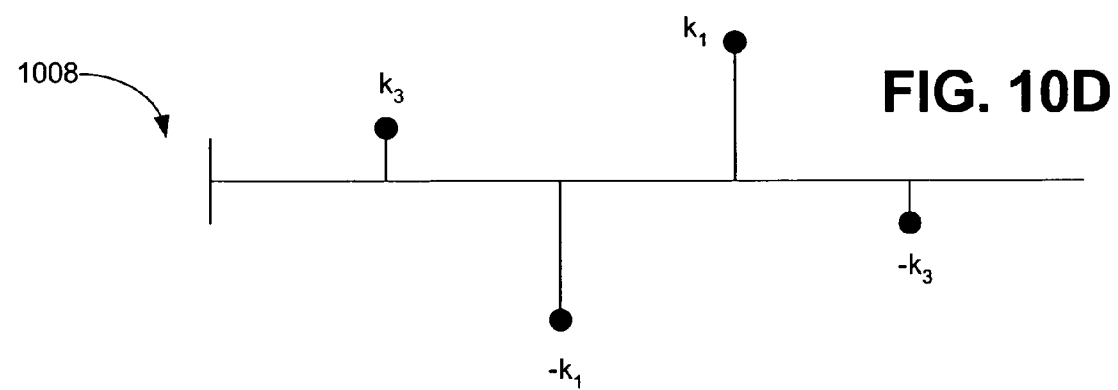

Filtering is performed across 8×8 block boundaries or 16×16 macroblock boundaries. Thus, filtering occurs across vertical block boundaries (1 and 2, e.g., as shown in FIGS. 4-7, for the luminance (or luma) component, and 1, e.g., as shown in FIG. 8, for the chrominance (or chroma) component) and then filtering across horizontal block boundaries (3, 4 and 5, e.g., as shown in FIGS. 4-8, for the luma component and 2, e.g., as shown in FIG. 8, for chroma). It is noted that right and bottom boundaries of a current macroblock remain unfiltered until filtering of succeeding horizontal and vertical neighbor macroblocks is complete. The previous filtered result is retained for at least one slice until it is stored back to the memory 104 via the connection 111.

FIG. 4 is a schematic diagram that illustrates the luminance component and boundaries filtered by the decoding system 100 and related ROS when mb_field_dct flags of a vertically adjacent block and a current block are both OFF. That is, FIG. 4 shows the block or macroblock boundary, related ROS, and the order of filtering when a current block and its vertical neighbor receive the mb_field_dct flags in an OFF state. The encoding/decoding process applies the DCT and quantization to the 8×8 block in the frame picture. Thus, blocking artifacts occur at the 8×8 block boundary as well as the macroblock boundary. The ROS consists of thirteen consecutive pixels across an 8×8 block boundary: five pixels (0-4) from left and upper neighbor blocks and eight pixels (5-12) from the current block. The de-blocking system 200 takes ten pixels symmetrically from each side of the boundary (0-4 and 5-9) and performs adaptive smoothing across the block boundary. The de-ringing system 300 takes twelve pixels anti-symmetrically (1-4 and 5-12) after de-blocking filtering and performs adaptive smoothing for the pixel locations from 3 to 10. It is noted that the de-ringing filtering is oriented inside the block instead of at the boundary.

FIG. 5 is a schematic diagram that illustrates the luminance component and boundaries filtered by the decoding system 100 and related ROS when mb_field_dct flags of a vertically adjacent block and a current block are both ON. That is, FIG. 5 shows the block boundary, related ROS, and the order of filtering when the mb_field_dct flags of the vertical neighbor block and the current block are both ON. It is noted that vertical de-blocking filtering is performed only across the macroblock boundary. Because the 8×8 DCT and quantization are applied to field-pixels within a 16×8 area, blocking artifact occurs only at the macroblock boundary in vertical direction. The vertical ROS is comprised of field pixels (see ROS3 (top field) and ROS4 (bottom field) in FIG. 5).

Figure 6:
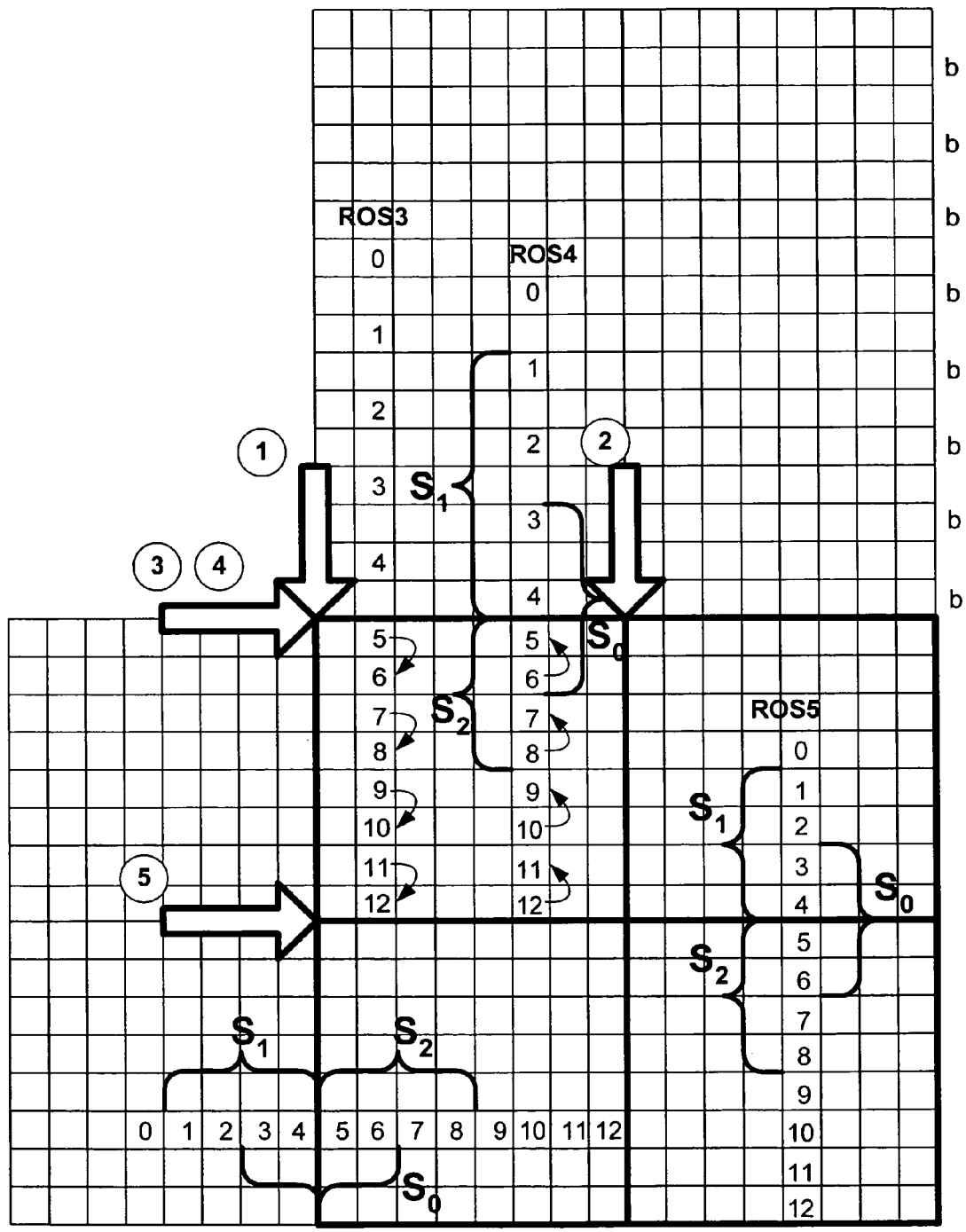
FIG. 6 is a schematic diagram that illustrates the luminance component and boundaries filtered by the decoding system of FIG. 1 and related ROS when mb_field_dct flags of a vertically adjacent block and a current block are both ON and OFF, respectively.

FIG. 6 is a schematic diagram that illustrates the luminance component and boundaries filtered by the decoding system 100 and related ROS when mb_field_dct flags of a vertically adjacent block and a current block are ON and OFF, respectively. That is, FIG. 6 shows the block boundary, related ROS, and the order of filtering when the mb_field_dct flags of the vertical neighbor block and the current block are ON and OFF, respectively. The small arrows in FIGS. 6-7 represent pixel replacement. That is, the pixel at the arrow head end is replaced with the pixel at the arrow tail start. This pixel replacement enables the decoding system 100 to form the ROS from the same fields in the case where mb_field_dct flags of vertically adjacent two macroblocks are different. The ROS belonging to the vertical neighbor macroblock comprises field pixels and the ROS belonging to the current macroblock comprises frame pixels. However, these regions of support (ROS4 and ROS5) are special cases. Half of the pixel locations from 5-12 (i.e., $v_5$ to $v_{12}$) are filled with the other half by pixel repetition, depending on the field parity (top or bottom) of the neighbor pixels 0-4 (i.e., $v_0$-$v_4$). Organizing the vertical ROS in the manner shown in FIG. 6 prevents the motion boundary from being corrupted after de-blocking filtering in an interlaced scanned image.

FIG. 7 is a schematic diagram that illustrates the luminance component and boundaries filtered by the decoding system 100 and related ROS when mb_field_dct flags of a vertically adjacent block and a current block are OFF and ON, respectively. That is, FIG. 7 shows the block boundary, related ROS, and the order of filtering when the mb_field_dct flags of the vertical neighbor block and the current block are OFF and ON, respectively. The vertical de-blocking filtering is also performed only at the macroblock boundary. Pixel repetition is also of use to get a set of complete five (5) pixels from $v_0$ to $v_4$ (see ROS3 and ROS4 in FIG. 7).

FIG. 8 is a schematic diagram that illustrates the chrominance component and boundaries filtered by the decoding system 100 and related ROS. That is, FIG. 8 shows the block boundary, related ROS, and the order of filtering for chrominance blocks. Regardless of mb_field_dct flags, the frame processing is always applied to chrominance pixels, since only 8×8 frame DCT and quantization are used for the chrominance component.

FIGS. 9A-9D are schematic diagrams that illustrate exemplary inputs and outputs for various modules of the decoding system 100. That is, shown are input and output pixels for filters 212-216 and the de-ringing system 300. The de-blocking system 200 takes ten pixels 905 (e.g., 0-9 (i.e., $v_0$-$v_9$)) from the ROS corresponding to input connection 215 and modifies its input pixels depending on the boundary discontinuity and the image characteristic around the block boundary.

The flat region filter 212 modifies 8 pixel positions, $v_1$-$v_8$, as shown in bold numerals along output line 907 corresponding to output connection 219, and the flat region filter 212 makes the pixel values change linearly from $v_1$ to $v_8$. The low activity region filter 214 affects only 4 pixel positions, $v_3$-$v_6$, as shown in bold corresponding to output connection 221. Because pixel values changed gradually over the two regions (i.e., left 4 pixels ($v_1$-$v_4$) and right 4 pixels ($v_5$-$v_8$)), the low activity region filter 214 only resolves discontinuities at the boundary pixels. The default filter 216 is applied to image details. The default filter 216 changes pixel values only on two pixel positions, $v_4$ and $v_5$, as shown in bold corresponding to output connection 223, which prevents the image details from blurring. The de-ringing system 300 takes twelve pixels, $v_1$-$v_{12}$ (shown in bold corresponding to output connection 117) from the ROS and the output of the de-blocking system 200, and modifies pixel values for the eight pixel locations from $v_3$ to $v_{10}$, as shown in bold corresponding to connection 121. The output of the adaptive filter 310 writes back to the slice memory 202, through the connection 121, the modified pixels $v_0$ to $v_4$ belonging to the right or bottom area of the preceding left and upper macroblock, and replaces unfiltered pixels of corresponding area to make a completely filtered macroblock in the slice memory 202. The completely filtered macroblock is output to memory system 104 via the connection 111. All of the filtered pixels in the current macroblock stay in the slice memory 202 until the right and bottom area of the macroblock are replaced with the newly filtered pixels.

The description that follows pertains to the 4×1 DCT module 208. Four (4) coefficients of the 4×1 DCT are defined as inner products of 4×1 DCT base vectors and 4×1 pixels.

$$a_0 = ([\,k_0\ \ k_0\ \ k_0\ \ k_0\,]\cdot[\,v_i\ \ v_{i+1}\ \ v_{i+2}\ \ v_{i+3}\,]^T),$$
$$a_1 = ([\,k_1\ \ k_3\ \ -k_3\ \ -k_1\,]\cdot[\,v_i\ \ v_{i+1}\ \ v_{i+2}\ \ v_{i+3}\,]^T),$$
$$a_2 = ([\,k_2\ \ -k_2\ \ -k_2\ \ k_2\,]\cdot[\,v_i\ \ v_{i+1}\ \ v_{i+2}\ \ v_{i+3}\,]^T),$$
$$a_3 = ([\,k_3\ \ -k_1\ \ k_1\ \ -k_3\,]\cdot[\,v_i\ \ v_{i+1}\ \ v_{i+2}\ \ v_{i+3}\,]^T),$$

where $$k_0 = 0.5 = \frac{4}{8},$$
$$k_1 = \frac{1}{\sqrt{2}}\cos\frac{\pi}{8} = 0.6533 \approx \frac{5}{8},$$
$$k_2 = \frac{1}{\sqrt{2}}\cos\frac{\pi}{4} = 0.5 = \frac{4}{8},$$
$$k_3 = \frac{1}{\sqrt{2}}\cos\frac{3\pi}{8} = 0.2706 \approx \frac{2}{8}.$$

Theoretically, the inner product projects an input vector onto a basis vector and enables decomposition of the input vector with the following form:

$$[v_i\ v_{i+1}\ v_{i+2}\ v_{i+3}] = a_0[k_0\ k_0\ k_0\ k_0] + a_1[k_1\ k_3\ -k_3\ -k_1] + a_2[k_2\ -k_2\ -k_2\ k_2] + a_3[k_3\ -k_1\ k_1\ -k_3].$$

One observation about the basis vector is that it reveals a specific image pattern, as shown in FIGS. 10A-10D. The FIGS. 10A-10D illustrate 4×1 DCT basis vectors 1002-1008 corresponding to the 4×1 DCT coefficients, $a_0$, $a_1$, $a_2$ and $a_3$, respectively. The location of each dot in FIGS. 10A-10D corresponds to a pixel location of $S_0$, $S_1$ or $S_2$ in FIGS. 4-8. The pixel values $k_0$-$k_3$ in the basis vectors 1002-1008 are defined in the preceding 4×1 DCT definition. The pixel values in $S_0$, $S_1$ or $S_2$ in FIGS. 4-8 can be reproduced exactly with the 4×1 DCT coefficients of $a_0$, $a_1$, $a_2$ and $a_3$, and corresponding basis vectors of 1002 [$k_0\ k_0\ k_0\ k_0$], 1004 [$k_1\ k_3\ -k_3\ -k_1$], 1006 [$k_2\ -k_2\ -k_2\ k_2$] and 1008 [$k_3\ -k_1\ k_1\ -k_3$]. The coefficients (e.g., $a_0$, $a_1$, etc.) can be viewed as contributions of corresponding basis vectors 1002-1008 in reproducing the input pixels, which is a consideration incorporated into the methodology of the mode decision module 210 to decide the image characteristics of the input 4×1 vector. Some exemplary conceptual criteria for flat, smooth and complex image regions may include the following: (1) A flat region: $a_1 \approx 0$ and $a_2 \approx 0$ and $a_3 \approx 0$; (2) a monotonic increasing/decreasing region: $a_1 \neq 0$ and $a_2 \approx 0$ and $a_3 \approx 0$; and (3) a complex region: $a_2 \neq 0$ or $a_3 \neq 0$.

The following description pertains to the mode decision module 210. Referring to FIGS. 4-8, assume $a_{0,1}$, $a_{1,1}$, $a_{2,1}$ and $a_{3,1}$ are the 4×1 DCT coefficients of the $S_1$ array and $a_{0,2}$, $a_{1,2}$, $a_{2,2}$ and $a_{3,2}$ are the 4×1 DCT coefficients of the $S_2$ array. Then, a flat region and a low activity region are detected by the mode decision module 210 according to the following criteria:

$S_1\_flat$=TRUE if $|a_{1,1}|<\epsilon_1$ and $|a_{2,1}|<\epsilon_2$ and $|a_{3,1}|<\epsilon_2$ or FALSE otherwise, $S_2\_flat$=TRUE if $|a_{1,2}|<\epsilon_1$ and $|a_{2,2}|<\epsilon_2$ and $|a_{3,2}|<\epsilon_2$ or FALSE otherwise, $S_1\_low\_activity$=TRUE if $|a_{1,1}|<\epsilon_1$ and $|a_{2,1}|<4\epsilon_2$ and $|a_{3,1}|<4\epsilon_2$ or FALSE otherwise, $S_2\_low\_activity$=TRUE if $|a_{1,2}|<\epsilon_1$ and $|a_{2,2}|<4\epsilon_2$ and $|a_{3,2}|<4\epsilon_2$ or FALSE otherwise.

Here, $\epsilon_1$ and $\epsilon_2$ ($\epsilon_1 \gg \epsilon_2$) are small positive threshold numbers to define a flat region. The $\epsilon_1$ is larger than $\epsilon_2$, and a monotonically changing region may be classified as a flat region while the change is small.

Figure 11:
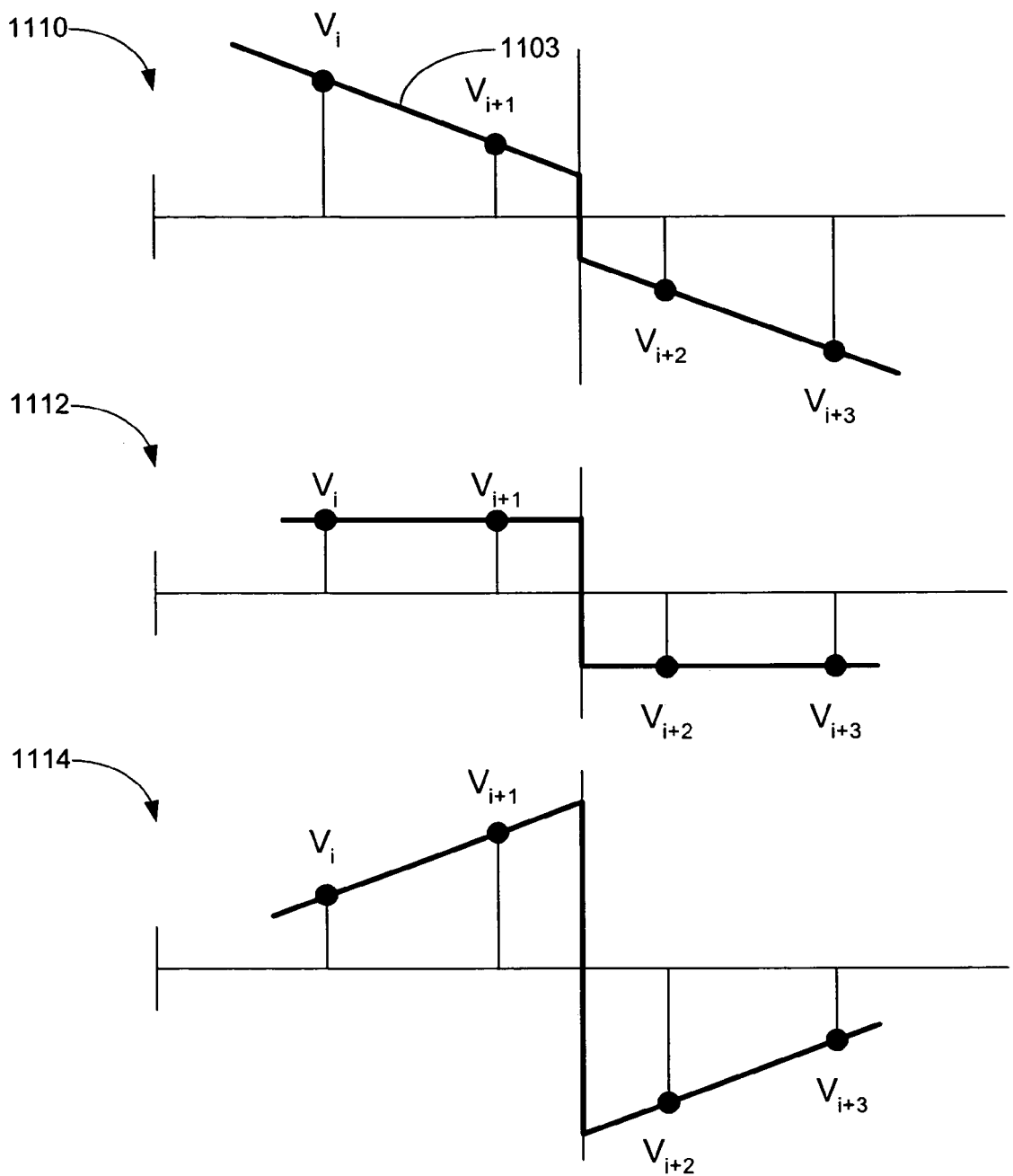
FIG. 11 is a schematic diagram that illustrates an exemplary image pattern reproduced from the 4×1 DCT basis vectors shown in FIGS. 10A-10D corresponding to the relation among 4×1 DCT coefficients.

Additionally, a boundary discontinuity can be defined by using the ratio of $a_1$ and $a_3$ coefficients. When the sign bits of $a_1$ and $a_3$ coefficients are different and the $a_2$ coefficient is negligible, the geometrical shape over the pixel array, [$v_i$ $v_{i+1}$ $v_{i+2}$ $v_{i+3}$], is changed along with the ratio of $a_1$ and $a_3$ coefficients, as illustrated in FIG. 11. The image pattern 1110 takes on a shape that is simple and monotonic at a ratio smaller than 2.14. However, the image patterns 1112 or 1114 take on shapes of a square or saw tooth, respectively, as the ratio increases. Assume $a_{0,0}$, $a_{1,0}$, $a_{2,0}$ and $a_{3,0}$ are the 4×1 DCT coefficients of the $S_0$ array. Then, a block boundary is located between the second ($v_{i+1}$) and the third ($v_{i+2}$) pixels, and the boundary discontinuity can be measured by comparing the ratio of $a_1$ and $a_3$ coefficients with two boundary values, 2.14−$THR_L$ and 2.14+$THR_H$. If the ratio value is within the two boundary values, it implies the $S_0$ array has a step edge at the block boundary (boundary discontinuity) because four pixel values show square-shape change. If the ratio is larger than upper bound (2.14+$THR_H$), it is a reasonable possibility that the step edge in the $S_0$ array can be an image pattern instead of a boundary discontinuity, because pixel values around block boundary are significantly different that monotonic. The boundary discontinuity, $S_0\_$discontinuity, becomes TRUE when all of the following conditions are satisfied: (1) $|a_{1,0}| \neq 0$, $|a_{3,0}| \neq 0$, $|a_{2,0}|<\epsilon_3$, sign($a_{1,0}$)$\neq$sign($a_{3,0}$), and (2) 2.14−$THR_L$<$|a_{1,0}|/|a_{3,0}|$<2.14+$THR_H$.

Reference is again made to FIG. 2, with continued reference to FIGS. 4-8. In particular, functionality of the mode decision module 210 in cooperation with the associated filters 212, 214, 216, and 218 is now described. The de-blocking system 200 selects the output from four different types of smoothing filters depending on the pixel conditions around a boundary. The filter selection flag is determined by the mode decision module 210 implementing the following exemplary pseudo code:

```
if ((S_1_flat ==TRUE) and (S_2_flat ==TRUE) and (|a_{1,0}| <= f(Qp)))
    Selecting output from Flat region filtering
else if (((S_0_discontinuity ==TRUE) or (S_1_low_activity ==TRUE) or
(S_2_low_activity ==TRUE)) and
        (|a_{1,0}| <= f(Qp))) {
    if ((S_0_discontinuity ==TRUE) and (S_1_low_activity ==TRUE) and
(S_2_low_activity ==TRUE))
        Selecting output from Low activity region filtering
    else if (|a_{2,0}| < ε_3)
        Selecting output from Default filtering
    else
        Selecting output from Bypassing de-blocking filtering
}
else Selecting output from Bypassing de-blocking filtering
```

It is noted that the $a_{1,0}$ coefficient is compared with the blocking artifact level which can be defined as the function of the quantization parameter. Because blocking artifact is caused by the quantization process, the boundary discontinuity due to quantization process (e.g., the step size across the block boundary) is smaller than the function of quantization step size unless the source of the discontinuity is from the real image edge. The $a_{1,0}$ coefficient can be a rough estimation of the boundary discontinuity belonging to the real image edge.

Referring to the filters 212, 214, and 216 (FIG. 2), the flat region filter 212 is configured in one embodiment as a nine (9)-tap smoothing filter that is applied inside a block as well as across a block boundary. The filtering process of such a nine (9)-tap smoothing filter 212 can be described as follows:

$$v'_n = \frac{1}{16}\left(\left(\sum_{k=-4}^{4} b_k \cdot p_{n+k}\right) + 8\right), 1 \leq n \leq 8$$

where $$p_m = \begin{cases} p_o, & m < 1 \\ v_m, & 1 \leq m \leq 8 \\ p_9, & m > 8, \end{cases}$$

$$p_o = \begin{cases} v_0, & |v_1 - v_0| < \text{Max}(8, Qp) \\ v_1, & \text{otherwise,} \end{cases}$$

$$p_9 = \begin{cases} v_9, & |v_8 - v_9| < \text{Max}(8, Qp) \\ v_8, & \text{otherwise,} \end{cases}$$

$\{b_k: -4 \leq k \leq 4\} = \{1, 1, 2, 2, 4, 2, 2, 1, 1\}$.

In the above equations, $p_0$ and $p_9$ are replacements of pixels outside the ROS and $b_k$ represents one of the coefficients of the exemplary nine (9)-tap smoothing filter. The flat region filter 212 is applied from the center of one block to another center of the other block sharing a block boundary. This filter 212 guarantees gradual change of the pixel value between both center pixels, and it maximizes the smoothing effect.

The low activity region filter 214 is configured in one embodiment as a nine (9)-tap smoothing filter that is applied only on the boundary pixels. Such a nine (9)-tap smoothing filter 214 can be exactly the same as the filter 212 used in the flat region filtering, but filtering is only performed on the boundary four pixels to avoid unwanted blurring. Such filtering can be described as follows:

$$v'_n = \frac{1}{16}\left(\left(\sum_{k=-4}^{4} b_k \cdot p_{n+k}\right) + 8\right), 3 \leq n \leq 6$$

The default filter 216 is configured in one embodiment as a three (3)-tap smoothing filter that is applied on the complex regions. To avoid unwanted blurring, default filtering is limited only to two boundary pixels, 4 and 5 (i.e., $v_4$ and $v_5$), and can be described as follows:

$$v'_n = \frac{1}{4}\left(\left(\sum_{k=-1}^{1} c_k \cdot p_{n+k}\right) + 2\right), 4 \leq n \leq 5$$

where, $\{c_k: -1 \leq k \leq 1\} = \{1, 2, 1\}$.

Figure 12:
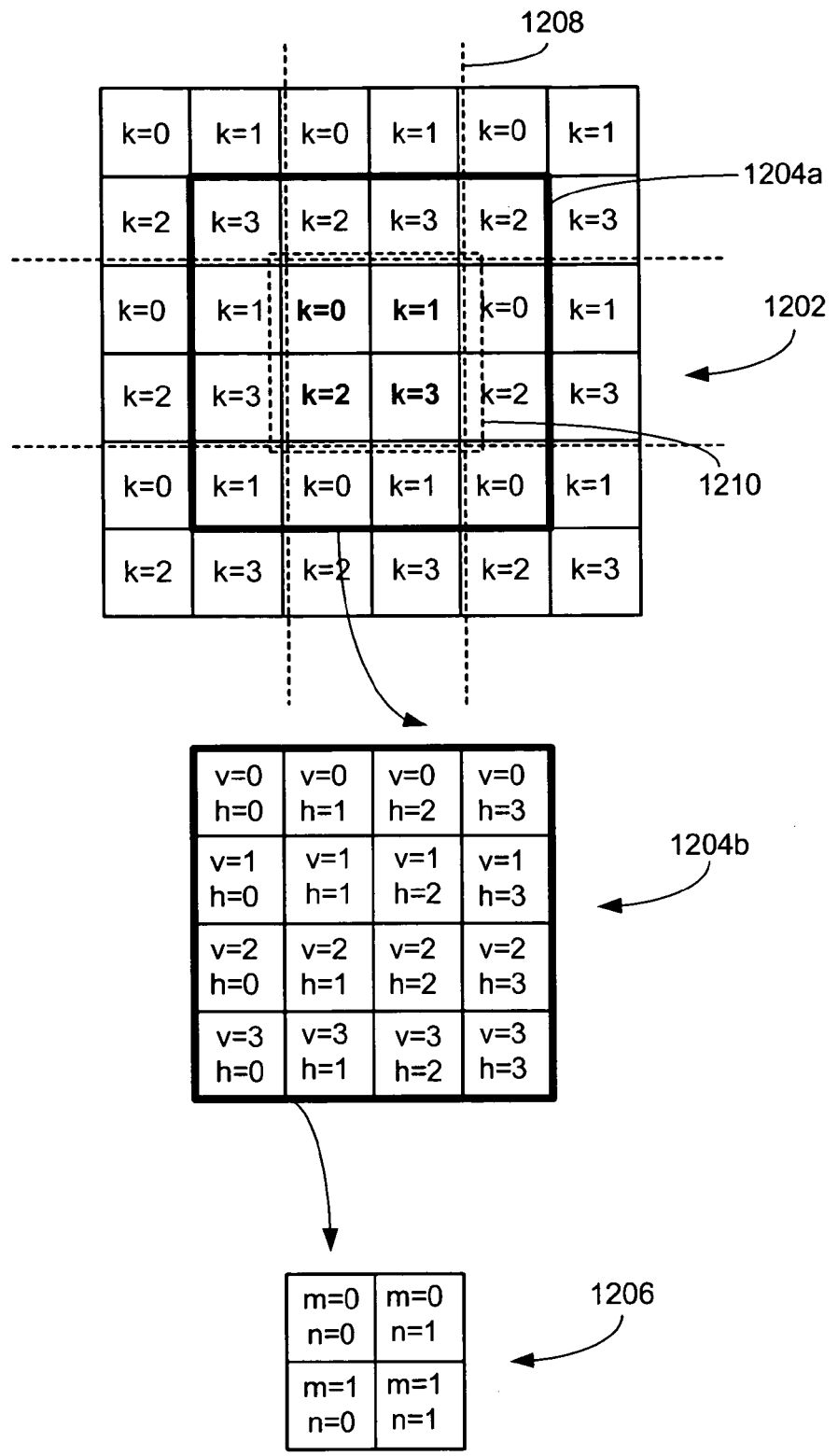
FIG. 12 is a schematic diagram that illustrates exemplary mapping of parameters employed by the de-ringing system shown in FIG. 3.
Figure 13:
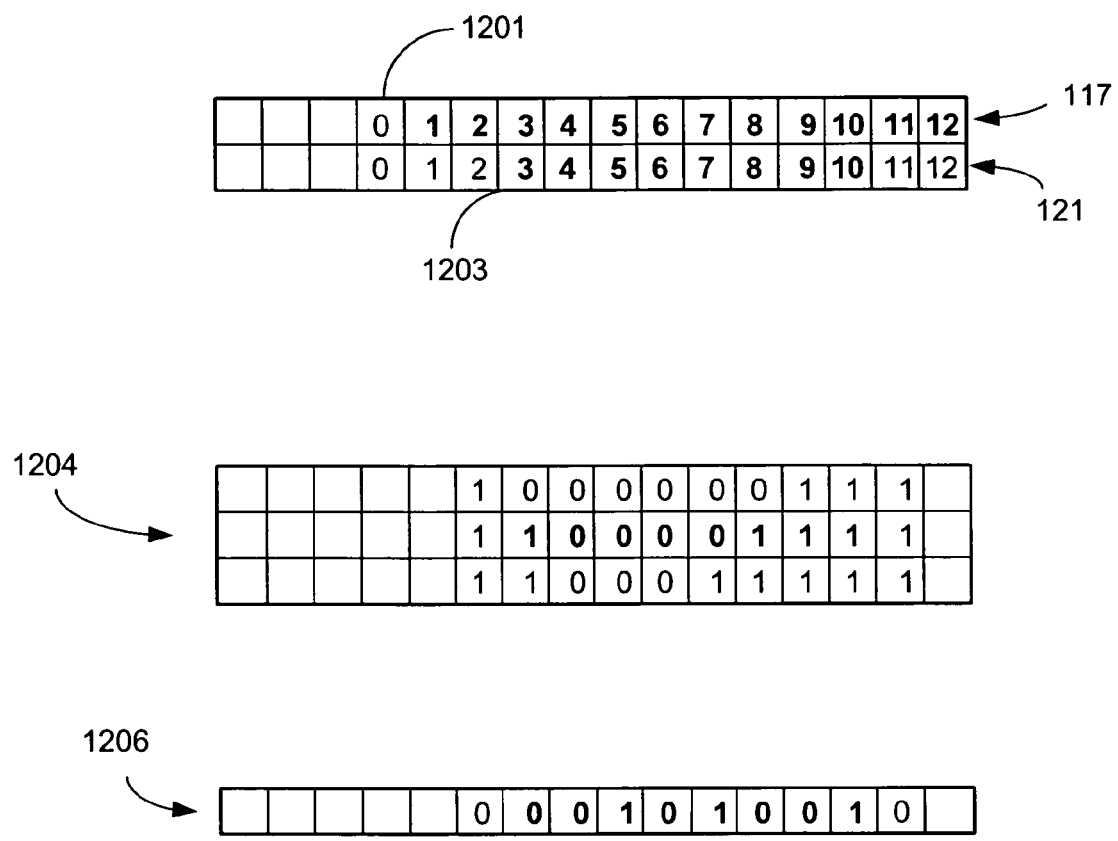
FIG. 13 is a schematic diagram of an exemplary edge map generated by the de-ringing system shown in FIG. 3.

Functionality of the de-ringing system 300 is now described in the context of FIGS. 12-13. In one embodiment, the de-ringing system 300 is applied only to the blocks belonging to the non-flat region. The de-ringing system 300 implements three sub-processes, namely threshold determination, edge map generation, and adaptive filtering. The threshold measure and block level edge map generation processes comprise two (2)-dimensional processes that are performed on an 8×8 block basis and are only applied for the luminance component. The pixel level edge map generation and adaptive filtering processes comprise a one (1)-dimensional process that takes the output of the de-blocking system 200 as its input in both horizontal and vertical directions.

With regard to the threshold measurement module 304, the maximum and minimum gray values are selected for a block and 12×12 pixels are referenced to find the maximum and minimum values. Three sets of maximum and minimum values are selected: maximum[k] and minimum[k] from all of the 12×12 pixels (frame-pixels), maximum_t[k] and minimum_t[k] from 6×12 top field pixels, and maximum_b[k] and The $k_{max}$ is the index, k, at which the range[k] shows the largest value among four, the $k'_{max}$ and $k''_{max}$ are the index, k, at which the range_t[k] and range_b[k] show the largest values, respectively. These values are of use to modify range[k] and thr[k]. The max_range_prev and max_thr_prev of the previous frame comprise parameter values that are calculated in the threshold propagation module 302 as explained below, and are also involved in the aforementioned modification. If there exists significant temporal correlation over the co-located macroblocks, the parameter values of the previous frame are evaluated to determine max_range_cur and max_thr_cur. The following pseudo code is an example of modifying range[k] and thr[k] in the threshold measurement module 304 in FIG. 3.

```
for (k=0; k<4; k++) {
    if (refresh==TRUE) {
        max_range_cur = max_range;
        max_thr_cur = max_thr;
    }
    else {
        if ((max_range_prev[k] > max_range) && (max_range_prev[k] >= 64)) {
            max_range_cur = max_range_prev[k];
            max_thr_cur = max_thr_prev[k];
        }
        else {
            max_range_cur = max_range;
            max_thr_cur = max_thr;
        }
    }
    if (range[k] < f(max_range_cur) && max_range_cur >= 64) {
        range[k] = (7*max_range_cur+4)/8;
        thr[k] = max_thr_cur;
    }
    if ((max_range_cur < min_noise_bnd) ||
        (mb_field_dct==OFF) && ((max_range_t < min_noise_bnd) && (max_range_b
        < 2Qp)) ||
        (mb_field_dct==OFF) && ((max_range_b < min_noise_bnd) && (max_range_t
        < 2Qp))) {
            range[k] = 0;
            thr[k] = 0;
    }
}
``` minimum_b[k] from 6×12 bottom field pixels. Further, the threshold value denoted by thr[k] and the dynamic ranges denoted by range[k], range_t[k], and range_b[k] are set as follows:

$thr[k]$=(maximum[$k$]+minimum[$k$]+1)/2, range[$k$]=maximum[$k$]−minimum[$k$], range_$t[k]$=maximum_$t[k]$−minimum_$t[k]$, range_$t[k]$=maximum_$t[k]$−minimum_$t[k]$.

An additional process is implemented by the threshold measurement module 304 to determine maximum values at a macroblock level. For instance, let max_range, max_range_t, max_range_b, and max_thr be the maximum values of range [k], range_t[k], range_b[k], and thr[k] at the maximum range [k], respectively. The index, k, changes from 0 to 3 in a macroblock. The following values are computed:

max_range=range[$k_{max}$], max_range_$t$=range_$t[k'_{max}]$, max_range_$b$=range_$b[k''_{max}]$, max_thr=thr[$k_{max}$].

Here, min_noise_bnd is a minimum dynamic range, which can be considered as noise variation. The refresh flag is calculated in the threshold measurement module 304. The refresh flag becomes TRUE when the mb_type is INTRA, magnitude of mb_mspeed_v is 3, or the magnitude of mb_mspeed_h is 3. These conditions imply the temporal correlation is broken among co-located macroblocks. If the refresh flag is not TRUE, the temporally propagated dynamic range and threshold values, max_range_prev[k] and max_thr_prev[k], can be applied to max_range_cur and max_thr_cur, conditionally. FIG. 12 shows the relation of indexes among range_prev[k]/thr_prev[k], range_prev[v, h]/thr_prev[v, h] and max_range_prev[m,n] and max_thr_prev[m,n]. The index translation occurs in the threshold propagation module 302 while implementing the pseudo code below. The block motion, mb_mspeed_v, and mb_mspeed_h, affects the index translation. The line 1208 denotes macroblock boundaries. The area designated by 1202 shows a relation between index, k, of the range_prev[k] and thr_prev[k] and corresponding position in the group of macroblocks. The range_prev[k] and thr_prev[k] inside 1204a are involved in the parameter propagation and the block 1210 is a co-located macroblock in the previous frame. The index, k, of the range_prev[k] and thr_prev[k] in 1204a can be translated to index (v, h) of the range_prev[v, h] and thr_prev[v, h] in 1204b to address with the exemplary pseudo code described below. That is, the following pseudo code is used in the threshold propagation block 302 of FIG. 3 to find max_range_prev and max_thr_prev. The block 1206 of the FIG. 12 shows index (m, n) of the max_range_prev[m,n] and max_thr_prev[m,n] corresponding to each block in the current macroblock.

```
for (m=0; m<2; m++)
  for (n=0; n<2; n++) {
    max_range = 0;
    for (i=0; i<2; i++) {
      if (mb_mspeed_v= =-1) v = m+i;
      else if (mb_mspeed_v= =0) v=i+1;
      else v=m+i+1;
      for (j=0; j<2; j++) {
        if (mb_speed_h= =-1) h=n+j;
        else if (mb_mspeed_h= =0) h=j+1;
        else h=n+j+1;
        if (max_range<range_prev[v][h]) {
          max_range = range_prev[v][h];
          max_thr = thr_prev[v][h];
        }
      }
    }
    max_range_prev[m*2+n] = max_range;
    max_thr_prev[m*2+n] = max_thr;
  }
```

Once the threshold value is determined, the block level edge map generation operation is performed by the edge map generation module 308 on an 8×8 block basis. Let rec[i][j] and edge_map[i][j] be the gray value at coordinates (i, j) where i, j=0, 1, 2, ..., 7, and the corresponding binary index, respectively. Then, the edge_map[i][j] can be obtained by:

```
if (rec[i][j] >= thr[k])
  edge_map[i][j] = 1;
else
  edge_map[i][j] = 0;
``` where the thr[k] denotes block level threshold value calculated in the threshold measurement module 304 and k is a block index within a macroblock.

Referring to FIG. 13 and FIGS. 1-3, and with regard to the pixel level edge map generation module 306, the module 306 receives ROS inputs 1201 after de-blocking filtering corresponding to connection 117, the filter selection flag of the de-blocking filter corresponding to connection 119 and the quantization scale factor corresponding to connection 113. The pixel level edge map calculated from the variation of the pixel values in the ROS input 1201. The variation is defined as the absolute difference between two successive pixel values. The following pseudo code is implemented in the pixel level edge map generation block 306.

```
If (filter selection flag of the de-blocking filter is not flat region filter) {
  If ((|v_{k-1} - v_k| > f(Qp)) or (|v_k - v_{k+1}| > f(Qp))
    e_k = 1;
  else
    e_k = 0;
}
else
  e_k = 1;
``` where k is an index of pixel location in the ROS and changes from 2 to 11. The $e_k$ denotes the pixel level edge map value at pixel location k.

FIG. 13 illustrates the input ROS of the de-ringing system 300 corresponding to connection 117, outputs of the adaptive filter corresponding to connection 121 and exemplary lock level edge map 1204 and pixel level edge map 1206. The output pixel locations coincide with the region having bold numbers in the example edge maps 1204 and 1206. For the luminance component, the filtering is applied if the binary indices in a 3×3 window in the block level edge map 1204 are all the same (i.e., all "0" indices or all "1" indices) and pixel level edge map does not show abrupt variation ($e_k$=0). The output pixel location, k, is the center of the 3×3 window. For the chrominance component, the filtering is applied based on only the pixel level edge map.

The detail filtering process can be summarized as follows:

$$v'_k = \begin{cases} \frac{(v_{k-1} + 2v_k + v_{k+1})}{4}, & e_{k-1} = e_k = e_{k+1} = 0 \\ \frac{(v_{k-1} + v_k)}{2}, & e_{k-1} = e_k = 0 \\ \frac{(v_k + v_{k+1})}{2}, & e_k = e_{k+1} = 0 \\ v_k, & \text{otherwise} \end{cases}$$

Figure 14:
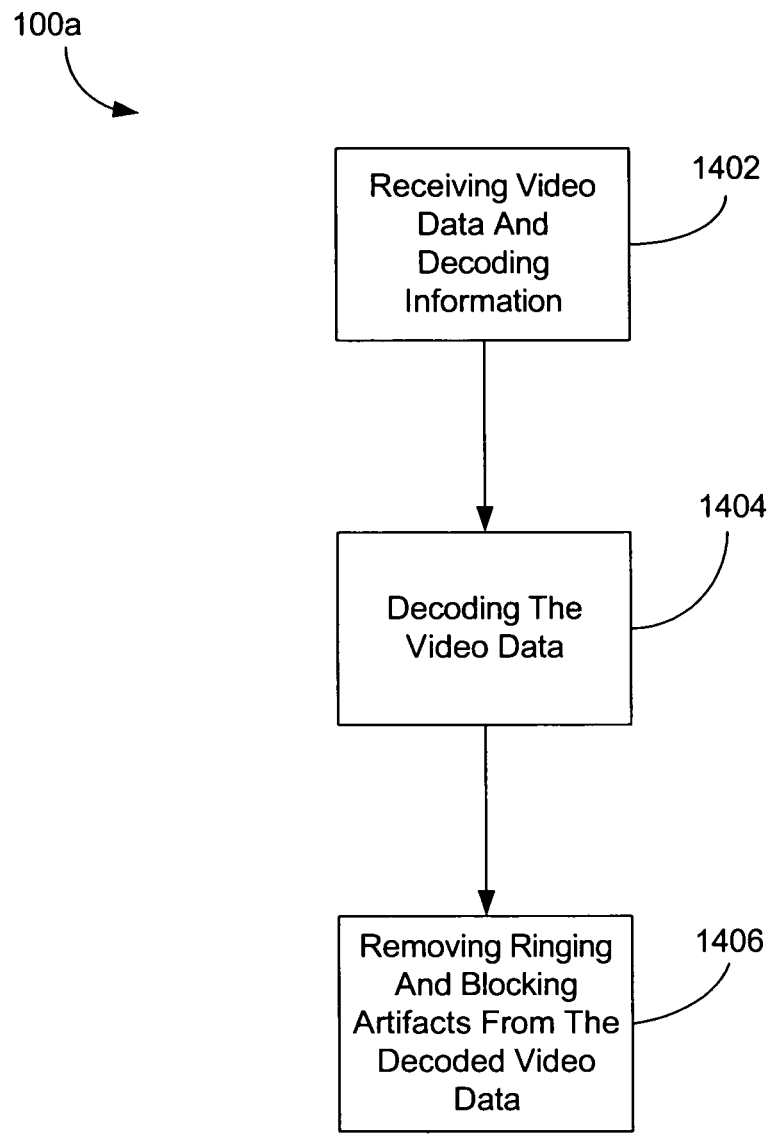
FIG. 14 is a flow diagram that illustrates a decoding method embodiment.

In view of the above description, it will be appreciated that one method embodiment 100a employed by the decoding system 100 and illustrated in FIG. 14 comprises receiving video data and decoding information (1402), decoding the video data (1404), and removing ringing and blocking artifacts from the decoded video data (1406).

Figure 15:
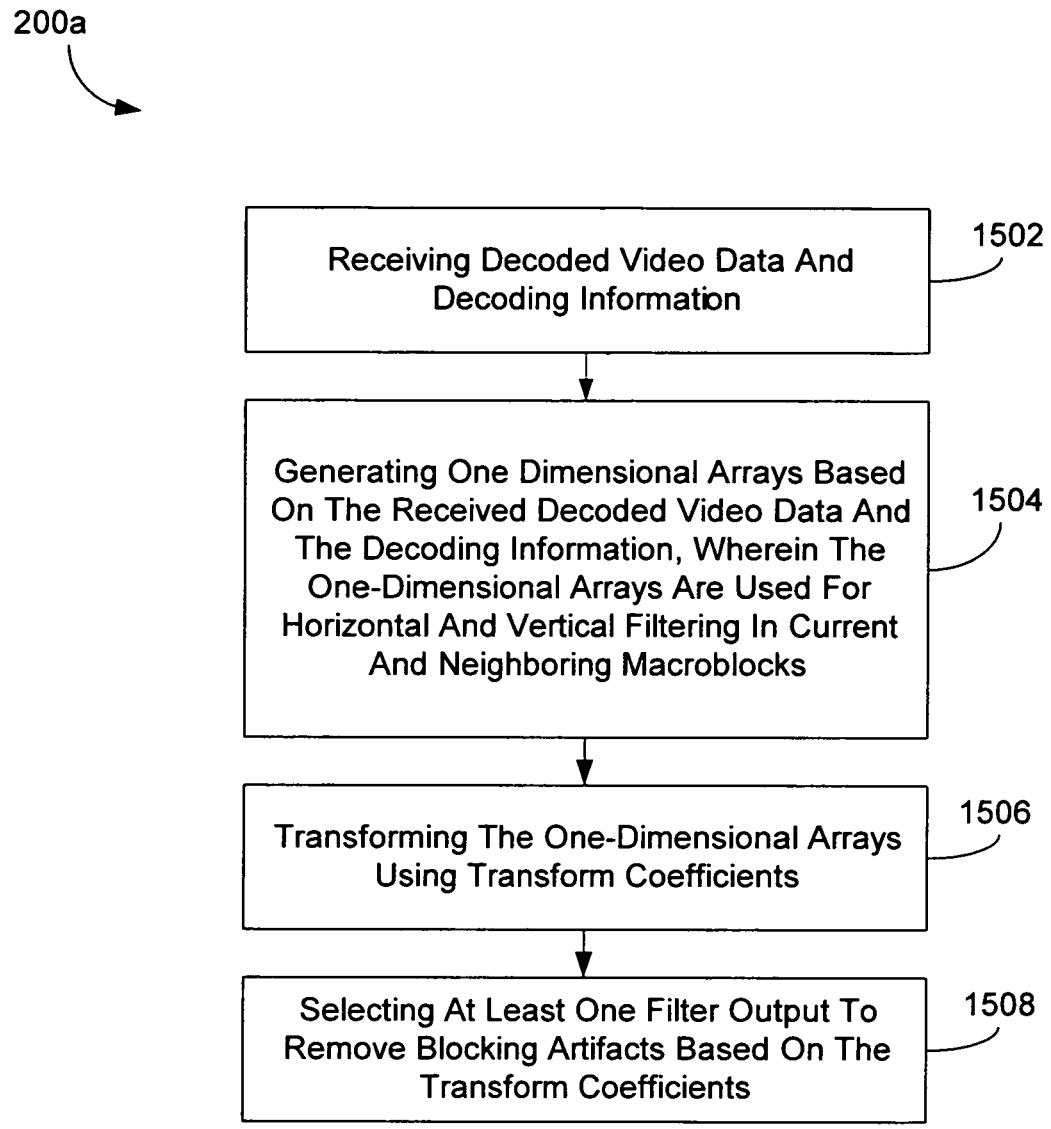
FIG. 15 is a flow diagram that illustrates a de-blocking method embodiment.

One method embodiment 200a employed by the de-blocking system 200 and illustrated in FIG. 15 comprises receiving decoded video data and decoding information (1502), generating one dimensional arrays based on the received decoded video data and the decoding information, wherein the one-dimensional arrays are used for horizontal and vertical filtering in current and neighboring macroblocks (1504), transforming the one-dimensional arrays using transform coefficients (1506), and selecting at least one filter output to remove blocking artifacts based on the transform coefficients (1508).

Figure 16:
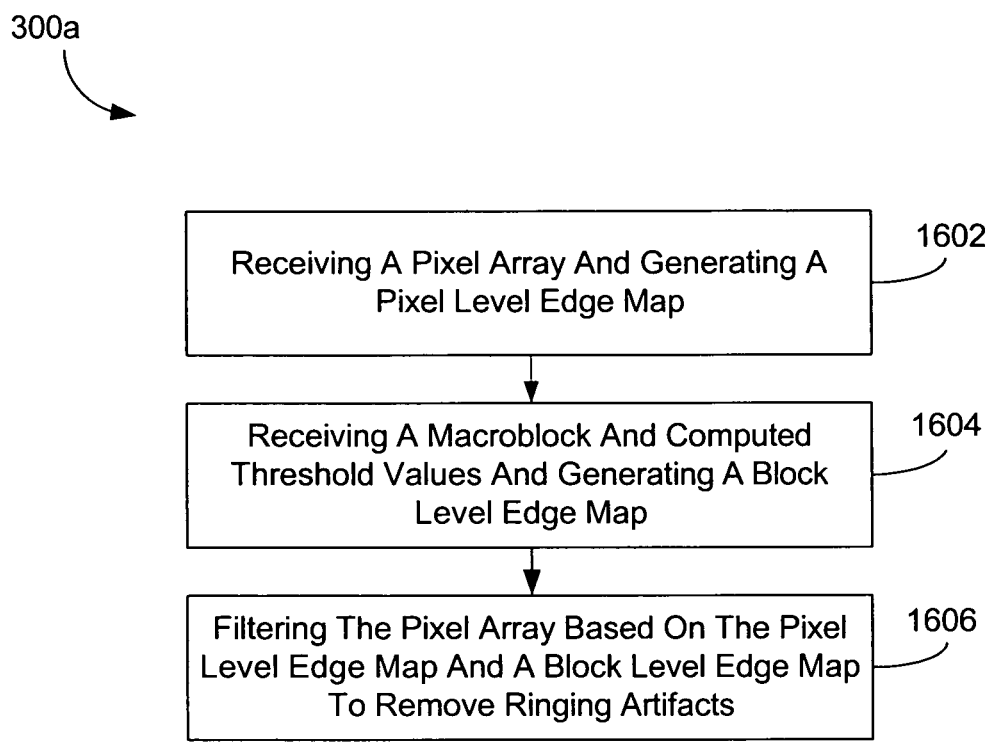
FIG. 16 is a flow diagram that illustrates a de-ringing method embodiment.

One method embodiment 300a employed by the de-ringing system 300 and illustrated in FIG. 16 comprises receiving a pixel array and generating a pixel level edge map (1602), receiving a macroblock and computed threshold values and generating a block level edge map (1604), filtering the pixel array based on the pixel level edge map and a block level edge map to remove ringing artifacts (1606).

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The decoding system 100 and various systems which comprise the same can be implemented in hardware, software, firmware, or a combination thereof. In the preferred embodiment(s), the decoding system 100 and associated systems are implemented in hardware, which can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

If implemented in software or firmware, the decoding system 100 and/or associated systems maybe embodied in a program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

It should be emphasized that the above-described embodiments of the present disclosure, particularly, any "preferred" embodiments, are merely possible examples of implementations, merely set forth for a clear understanding of the principles of the invention. Many variations and modifications may be made to the above-described embodiment(s) without departing substantially from the spirit and principles of the invention. All such modifications and variations are intended to be included herein within the scope of this disclosure and protected by the following claims.

What is claimed:
1. A method, comprising:
receiving video data and decoding information; and
decoding the video data, including:
generating one dimensional arrays based on the received video data and decoding information, wherein the arrays are used for filtering in current and neighboring macroblocks;
organizing input pixels into five groups based on the decoding information, the input pixels corresponding to the decoded video data;
selecting one of four deblocking filtering modes based on an analysis of discrete cosine transform coefficients of the five groups of input pixels; and
removing ringing and blocking artifacts from the decoded video data.

2. The method of claim 1, wherein receiving video data and decoding information comprises receiving video data and decoding information corresponding to an MPEG-based bit stream.

3. The method of claim 1, further comprising detecting and smoothing out boundary discontinuities across n×m block boundaries corresponding to input pixels corresponding to the decoded video data, wherein m and n each comprise integer numbers greater than or equal to four.

4. The method of claim 1, further comprising spreading out flat regions near an edge of an n×m block corresponding to input pixels corresponding to the decoded video data, wherein m and n each comprise integer numbers greater than or equal to four.

5. The method of claim 1, further comprising generating an edge map and distinguishing the ringing artifacts from a real image edge based on the generated edge map, the real image edge corresponding to input pixels corresponding to the decoded video data.

6. The method of claim 1, wherein removing comprises removing the ringing artifact after removing the blocking artifact.

7. The method of claim 1, wherein selecting one of four filtering modes comprises selecting one of a flat region filtering mode, low activity region filtering mode, default filtering mode, and bypass mode.

8. The method of claim 1, further comprising discerning between actual image patterns corresponding to input pixels corresponding to the decoded video data.

9. The method of claim 8, wherein discerning comprises evaluating bitstream information and a quantization parameter.

10. The method of claim 1, further comprising generating a pixel level and block level edge map based on computing a block level threshold value and a pixel level threshold value.

11. The method of claim 10, wherein computing comprises computing a block level threshold value corresponding to a temporally neighboring macroblock.

12. The method of claim 10, wherein computing comprises evaluating a quantization parameter.

13. The method of claim 1, further comprising selecting at least one filter output to remove the ringing and blocking artifacts and other distortion based on image characteristics corresponding to input pixels corresponding to the decoded video data.

14. A decoding system, comprising:
a de-blocking system configured to receive decoded video data and decoding information and remove blocking artifacts from the decoded video data;
wherein the deblocking system includes a discrete cosine transform module responsive to groups of input pixels corresponding to the decoded video data and providing discrete cosine transform coefficients for the groups of decoded video data; and
a mode decision and selection module responsive to the discrete cosine transform coefficients for the groups of decoded video data, the mode decision and selection module selecting one of a four filter modes based on an analysis of the discrete cosine transform coefficients for the groups of decoded video data; and
a de-ringing system configured to remove ringing artifacts from the de-blocked video data via generation of a block level edge map for each macroblock and performing adaptive filtering based on the block level edge map;
wherein at least one of the de-blocking system, the discrete cosine transform module, the mode decision and selection module and/or the de-ringing system are implemented by one or more processors.

15. The decoding system of claim 14, further comprising a decoder configured to receive video data and decode the same.

16. The decoding system of claim 14, wherein the de-blocking system is configured to detect and smooth out boundary discontinuities across n×m block boundaries corresponding to input pixels corresponding to the decoded video data, wherein m and n each comprise integer numbers greater than or equal to four.

17. The decoding system of claim 14, wherein the de-ringing system is configured to spread out flat regions near an edge of an n×m block corresponding to input pixels corresponding to the decoded video data, wherein m and n each comprise integer numbers greater than or equal to four.

18. The decoding system of claim 14, wherein the de-ringing system is configured to generate an edge map and distinguish the ringing artifacts from a real image edge based on the generated edge map, the real image edge corresponding to input pixels corresponding to the decoded video data.

19. The decoding system of claim 14, wherein the de-ringing system is configured to remove the ringing artifact after the de-blocking system removes the blocking artifact.

20. The decoding system of claim 14, wherein the wherein the four filter modes include a flat region filtering mode, low activity region filtering mode, default filtering mode, and bypass mode.

21. The decoding system of claim 14, wherein the deblocking system is configured to classify image characteristics groups of input pixels corresponding to the decoded video data based on an analysis of discrete cosine transform coefficients of the groups of input pixels.

22. The decoding system of claim 14, wherein the de-blocking system is configured to discern between actual image patterns corresponding to input pixels corresponding to the decoded video data.

23. The decoding system of claim 22, wherein the de-blocking system is configured to discern by evaluating bit-stream information and a quantization parameter.

24. The decoding system of claim 14, wherein the de-ringing system is configured to generate a pixel level and block level edge map based on computing a block level threshold value and a pixel level threshold value.

25. The decoding system of claim 24, wherein the de-ringing system is configured to compute a block level threshold value corresponding to a temporally neighboring macroblock.

26. The decoding system of claim 25, wherein the de-ringing system is configured to compute by evaluating a quantization parameter.

27. The decoding system of claim 14, wherein the de-blocking system is configured to select at least one filter output to remove the ringing and blocking artifacts and other distortion based on image characteristics corresponding to input pixels corresponding to the decoded video data.

28. A decoding system, comprising:
  means for receiving video data and decoding information and decoding the video data; including
    means for generating one dimensional arrays based on the received video data and decoding information, wherein the arrays are used for filtering in current and neighboring macroblocks;
    means for organizing input pixels into five groups based on the decoding information, wherein the input pixels correspond to the decoded video data: and
    means for selecting one of four filtering modes based on an analysis of discrete cosine transform coefficients of the groups of input pixels: and
  means for removing ringing and blocking artifacts from the decoded video data.

29. The system of claim 28, further comprising means for displaying the de-blocked and de-ringed video data.

* * * * *